(12) United States Patent
Zhu et al.

(10) Patent No.: US 11,144,112 B2
(45) Date of Patent: Oct. 12, 2021

(54) SYSTEMS AND METHODS FOR CREATING HAPTIC PROXIES FOR USE IN VIRTUAL REALITY

(71) Applicant: City University of Hong Kong, Kowloon (HK)

(72) Inventors: Kening Zhu, Shatin (HK); Feng Han, Kowloon (HK); Taizhou Chen, Kowloon (HK); Yi-Shiun Wu, Taipei (TW)

(73) Assignee: City University of Hong Kong, Kowloon (HK)

( * ) Notice: Subject to any disclaimer, the term of this patent is extended or adjusted under 35 U.S.C. 154(b) by 11 days.

(21) Appl. No.: 16/392,142

(22) Filed: Apr. 23, 2019

(65) Prior Publication Data

US 2020/0341538 A1    Oct. 29, 2020

(51) Int. Cl.

| | |
|---|---|
| *G06F 3/01* | (2006.01) |
| *A63H 33/10* | (2006.01) |
| *A63F 9/08* | (2006.01) |
| *G06T 17/10* | (2006.01) |
| *G06T 19/20* | (2011.01) |

(Continued)

(52) U.S. Cl.
CPC .............. *G06F 3/011* (2013.01); *A63F 9/088* (2013.01); *A63H 33/102* (2013.01); *G06F 3/016* (2013.01); *G06T 17/10* (2013.01); *G06T 19/20* (2013.01); *A63F 2009/2442* (2013.01)

(58) Field of Classification Search
CPC ........ G06F 3/011; G06F 3/016; G06F 3/0482; A63F 9/088; A63H 33/102
See application file for complete search history.

(56) References Cited

U.S. PATENT DOCUMENTS 7,119,819 B1 * 10/2006 Robertson ........... G06F 3/04815
                                                                    715/782
7,542,040 B2 *  6/2009 Templeman ............ G06F 3/011
                                                                    345/474

(Continued)

OTHER PUBLICATIONS

Robotic Assembly of Haptic Proxy Objects for Tangible Interaction and Virtual Reality Yiwei Zhao, Lawrence H. Kim, Ye Wang, Mathieu Le Goc, Sean Follmer Stanford UniversityISS '17, Oct. 17-20, 2017, Brighton, United Kingdom.*

(Continued)

*Primary Examiner* — Nicholas Augustine
(74) *Attorney, Agent, or Firm* — Norton Rose Fulbright US LLP

(57) ABSTRACT

Systems and methods which provide for interactive haptic proxies for hand-graspable virtual reality (VR) objects using reconfigurable artifacts and facilitated through use of a haptic reconfigurable artifact toolkit are described. Embodiments provide a haptic reconfigurable artifact toolkit including a set of reconfigurable artifacts for use in forming reconfigurable artifact-based haptic proxies, a set of haptic hardware components for use with respect to reconfigurable artifact-based haptic proxies, and a haptic reconfigurable artifact software platform configured to facilitate generation of reconfigurable artifact-based haptic proxies using items of the set of reconfigurable artifacts and the set of haptic hardware components. Reconfigurable artifacts may be shaped to form reconfigurable artifact-based haptic proxies covering a wide range of hand-grasp postures.

42 Claims, 8 Drawing Sheets

(51) Int. Cl.
*G06F 3/00* (2006.01)
*A63F 9/24* (2006.01)

(56) References Cited

U.S. PATENT DOCUMENTS

| | | | | |
|---|---|---|---|---|
| 9,696,795 | B2* | 7/2017 | Marcolina | G06T 19/006 |
| 9,996,797 | B1* | 6/2018 | Holz | G06F 3/04842 |
| 2004/0193441 | A1* | 9/2004 | Altieri | A63F 13/65 709/203 |
| 2010/0115428 | A1* | 5/2010 | Shaping | G06F 16/9577 715/760 |
| 2010/0205541 | A1* | 8/2010 | Rapaport | G06F 16/285 715/753 |
| 2010/0214284 | A1* | 8/2010 | Rieffel | G06T 17/00 345/419 |
| 2010/0274567 | A1* | 10/2010 | Carlson | G06Q 30/0225 705/1.1 |
| 2010/0274627 | A1* | 10/2010 | Carlson | G06Q 20/3224 705/51 |
| 2011/0010636 | A1* | 1/2011 | Hamilton, II | A63F 13/67 715/747 |
| 2017/0185261 | A1* | 6/2017 | Perez | G06F 3/04815 |

OTHER PUBLICATIONS

Abtahi, P. et al. "Visuo-Haptic Illusions for Improving the Perceived Performance of Shape Displays" In Proceedings of the 2018 CHI Conference on Human Factors in Computing Systems, Apr. 2018, 13 pages.

Aguerreche, L. et al. "Reconfigurable Tangible Devices for 3D Virtual Object Manipulation by Single or Multiple Users" In Proceedings of the 17th ACM Symposium on Virtual Reality Software and Technology, Nov. 2010, 4 pages.

Azmandian, M. et al. "Haptic Retargeting: Dynamic Repurposing of Passive Haptics for Enhanced Virtual Reality Experiences" In Proceedings of the 2016 CHI Conference on Human Factors in Computing Systems, May 2016, 12 pages.

Benko, H. et al. "NormalTouch and TextureTouch: High-Fidelity 3D Haptic Shape Rendering on Handheld Virtual Reality Controllers" In Proceedings of the 29th Annual Symposium on User Interface Software and Technology, Oct. 2016, 12 pages.

Bouzit, M. et al. "The Rutgers Master II-New Design Force-Feedback Glove" IEEE/ASME Transactions on Mechatronics, vol. 7, No. 2, Jun. 2002, 8 pages.

Cheng, L.-P. et al. "iTurk: Turning Passive Haptics into Active Haptics by Making Users Reconfigure Props in Virtual Reality" In Proceedings of the 2018 CHI Conference on Human Factors in Computing Systems, Apr. 2018, 10 pages.

Cheng, L.-P. et al. "Turkdeck: Physical Virtual Reality Based on People" In Proceedings of the 28th Annual ACM Symposium on User Interface Software & Technology, Nov. 2015, 10 pages.

Choi, I. et al. "Grabity: A Wearable Haptic Interface for Simulating Weight and Grasping in Virtual Reality" In Proceedings of the 30th Annual ACM Symposium on User Interface Software and Technology, Oct. 2017, 12 pages.

Choi, I. et al. "Wolverine: A Wearable Haptic Interface for Grasping in Virtual Reality" In Intelligent Robots and Systems (IROS), Oct. 2016, 8 pages.

Choi, I. et al. "CLAW: A Multifunctional Handheld Haptic Controller for Grasping, Touching, and Triggering in Virtual Reality" In Proceedings of the 2018 CHI Conference on Human Factors in Computing Systems, Apr. 2018, 13 pages.

F. I. M. Craik, "A Functional Account of Age Differences in Memory" In: F. Klix and H. Hagendorf, Eds., Human Memory and Cognitive Capabilities: Mechanisms and Performances, Elsevier, Amsterdam, 1986, pp. 409-422, 14 pages.

Dell, N. et al. ""Yours is Better!" Participant Response Bias in HCI" In Proceedings of the SIGCHI Conference on Human Factors in Computing Systems, May 2012, 10 pages.

Feix, T. et al. "The GRASP Taxonomy of Human Grasp Types" IEEE Transactions on Human-Machine Systems, vol. 46, No. 1, Feb. 2016, 12 pages.

Fiore, A. (1981). Shaping Rubik's Snake. Penguin Australia, 128 pages.

Follmer. S. et al. "inFORM: Dynamic Physical Affordances and Constraints Through Shape and Object Actuation" In UIST, Oct. 2013, 10 pages.

Fujinawa, E. et al. "Computational Design of Hand-Held VR Controllers Using Haptic Shape Illusion" In Proceedings of the 23$^{rd}$ ACM Symposium on Virtual Reality Software and Technology, Nov. 2017, 10 pages.

Hart, S. G. et al. "Development of NASA-TLX (Task Load Index): Results of Empirical and Theoretical Research" In Advances in Psychology, vol. 52, 1988, 46 pages.

Heo, S. et al. "Thor's Hammer: An Ungrounded Force Feedback Device Utilizing Propeller-Induced Propulsive Force" In Proceedings of the CHI Conference on Human Factors in Computing Systems, Apr. 2018, 11 pages.

Hettiarachchi, A. et al. "Annexing Reality: Enabling Opportunistic Use of Everyday Objects as Tangible Proxies in Augmented Reality" In Proceedings of the 2016 CHI Conference on Human Factors in Computing Systems, May 2016, 11 pages.

Hinckley, K. et al. "Passive Real-World Interface Props for Neurosurgical Visualization" In Proceedings of the SIGCHI Conference on Human Factors in Computing Systems, Apr. 1994, 7 pages.

Holman, D. et al. "Organic User Interfaces: Designing Computers in Any Way, Shape, or Form" Communications of the ACM, vol. 51, No. 6, Jun. 2008, 8 pages.

Strasnick, E. et al. "Haptic Links: Bimanual Haptics for Virtual Reality Using Variable Stiffness Actuation" In Proceedings of the 2018 CHI Conference on Human Factors in Computing Systems, Apr. 2018, 12 pages.

Huang, D.-Y. et al. "RetroShape: Leveraging Rear-Surface Shape Displays for 2.5D Interaction on Smartwatches" In Proceedings of the 30th Annual ACM Symposium on User Interface Software and Technology, Oct. 2017, 13 pages.

Insko, B. E. (2001). Passive Haptics Significantly Enhances Virtual Environments (Doctoral Dissertation, University of North Carolina at Chapel Hill), 111 pages.

Ishii, H. "The Tangible User Interface and its Evolution" Communications of the ACM, vol. 51, No. 6, Jun. 2008, 5 pages.

Ishii H. et al. "Radical Atoms: Beyond Tangible Bits, Toward Transformable Materials" interactions, vol. 19, No. 1, Jan. 2012, 16 pages.

Jackson, B. et al. "A Lightweight Tangible 3D Interface for Interactive Visualization of Thin Fiber Structures" IEEE Transactions on Visualization and Computer Graphics, vol. 19, No. 12, 2013, 8 pages.

Jang, S. et al. "Haptic Edge Display for Mobile Tactile Interaction" In Proceedings of the 2016 CHI on Conference Human Factors in Computing Systems, May 2016, 11 pages.

Kim, H. et al. "Morphees+: Studying Everyday Reconfigurable Objects for the Design and Taxonomy of Reconfigurable UIs" In Proceedings of the 2018 CHI Conference on Human Factors in Computing Systems, Apr. 2018, 14 pages.

Lindeman, R. et al. "Hand-Held Windows: Towards Effective 2D Interaction in Immersive Virtual Environments" In Proceedings IEEE Virtual Reality, 1999, 8 pages.

Lo, J.-Y. et al. "RollingStone: Using Single Slip Taxel for Enhancing Active Finger Exploration with a Virtual Reality Controller" In Proceedings of the 31st Annual ACM Symposium on User Interface Software and Technology, Oct. 2018, 13 pages.

MacKenzie, C. L., & Iberall, T. (1994). The Grasping Hand (vol. 104). Elsevier. (Chapters 3, 9, and Appendix D) 32 pages.

McClelland, J. C. et al. "HaptoBend: Shape-Changing Passive Haptic Feedback in Virtual Reality" In Proceedings of the 5th Symposium on Spatial User Interaction, Oct. 2017, 9 pages.

Moller, T. et al. "Fast, Minimum Storage Ray/Triangle Intersection" Journal of Graphics Tools, vol. 2, No. 1, 1997, 7 pages.

Mueller, S. et al. "faBrickation: Fast 3D Printing of Functional Objects by Integrating Construction Kit Building Blocks" In Pro-

(56) References Cited

OTHER PUBLICATIONS ceedings of the SIGCHI Conference on Human Factors in Computing Systems, Apr. 2014, 8 pages.
Perry, J.C. et al. "Upper-Limb Powered Exoskeleton Design" IEEE/ASME Transactions on Mechatronics, vol. 12, No. 4, Aug. 2007, 10 pages.
Provancher, W. "Creating Greater VR Immersion by Emulating Force Feedback with Ungrounded Tactile Feedback" IQT Quarterly, vol. 6, No. 2, 2014, 4 pages.
Rasmussen, M. K. et al. "Shape-Changing Interfaces: A Review of the Design Space and Open Research Questions" In Proceedings of the SIGCHI Conference on Human Factors in Computing Systems, May 2012, 10 pages.
Reniers, D. et al. "Skeleton-Based Hierarchical Shape Segmentation" IEEE International Conference on Shape Modeling and Applications, Jun. 2007, 10 pages.
Schweikardt, E. et al. "The Robot is the Program: Interacting with roBlocks" In Proceedings of the 2nd International Conference on Tangible and Embedded Interaction, Feb. 2008, 2 pages.
Sheng, J. et al. "An Interface for Virtual 3D Sculpting Via Physical Proxy" In Proceedings of the 4th International Conference on Computer Graphics and Interactive Techniques, Nov. 2006, 8 pages.
Simeone, A. L. et al. "Substitutional Reality: Using the Physical Environment to Design Virtual Reality Experiences" In Proceedings of the 33rd Annual ACM Conference on Human Factors in Computing Systems, Apr. 2015, 10 pages.
Strobel, J. (2010). All the Better to See You With: A Comparison of Approaches to Delivering Instructions for Lego Construction Tasks (Doctoral Dissertation, Bowling Green State University), 56 pages.
Strohmeier, P. et al. "Generating Haptic Textures with a Vibrotactile Actuator" In Proceedings of the 2017 CHI Conference on Human Factors in Computing Systems, May 2017, 12 pages.
Teng, S.-Y. et al. "PuPoP: Pop-up Prop on Palm for Virtual Reality" In Proceedings of the 31st Annual ACM Symposium on User Interface Software and Technology, Oct. 2018, 13 pages.
Weller, M. P. et al. "Tangible Sketching in 3D with Posey" In Extended Abstracts on Human Factors in Computing Systems, Apr. 2009, 6 pages.
Whitmire, E. et al. "Haptic Revolver: Touch, Shear, Texture, and Shape Rendering on a Reconfigurable Virtual Reality Controller" In Proceedings of the 2018 CHI Conference on Human Factors in Computing Systems, Apr. 2018, 12 pages.
Witmer, B. G. et al. "Measuring Presence in Virtual Environments: A Presence Questionnaire" Presence: Teleoperators and Virtual Environments, vol. 7, No. 3, Jun. 1998, 17 pages.
Yem, V. et al. "Wearable Tactile Device Using Mechanical and Electrical Stimulation for Fingertip Interaction with Virtual World" In IEEE Virtual Reality, Mar. 2017, 6 pages.
Zenner, A. et al. "Shifty: A Weight-Shifting Dynamic Passive Haptic Proxy to Enhance Object Perception in Virtual Reality" IEEE Transactions on Visualization and Computer Graphics, vol. 23, No. 4, 2017, 10 pages.
Zhao, Y. et al. "Robotic Assembly of Haptic Proxy Objects for Tangible Interaction and Virtual Reality" In Proceedings of the ACM International Conference on Interactive Surfaces and Spaces, Oct. 2017, 10 pages.
Zhu, K. et al. "HapTwist: Creating Interactive Haptic Proxies in Virtual Reality Using Low-cost Twistable Artefacts" In Proceedings Virtual & Augmented Reality, Dec. 2018, 13 pages.

\* cited by examiner

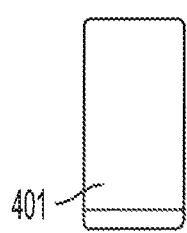
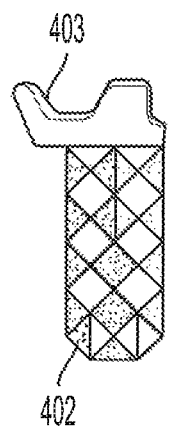
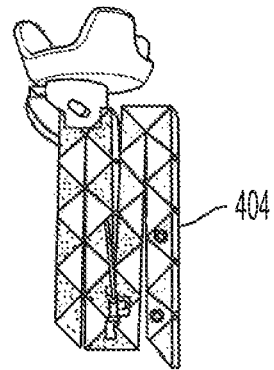
FIG. 4A  FIG. 4B  FIG. 4C
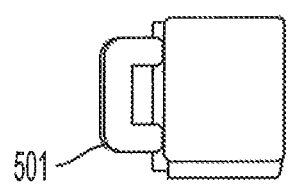
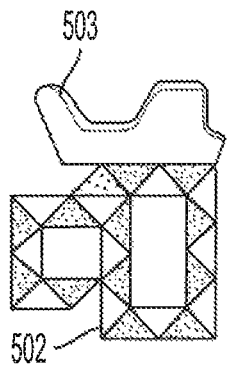
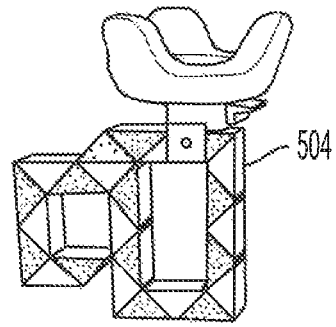
FIG. 5A  FIG. 5B  FIG. 5C

*prism Placement (P, V, T)*

Input: A list *P* of currently generated prism
        A list *V* of voxels generated based on the 3D model
        A skeleton tree *T* in the form of list

Output: An updated list $P_{update}$ with a newly generated prism if (all skeleton nodes in *T* has been covered or all voxels in *V* has been covered)
        return *P* as $P_{update}$ get the last prism *plast* in *P*.
create the list of $P_{update}$ of possible placement for the new prism, denoted as $P_{possible} = \{p0, p45, p90, p135\}$, according to the relative position and orientation to *plast* as shown in Fig. 12.

for each *pk* in $P_{possible}$ $k \in \{0, 45, 90, 135\}$
        compute the placement score
            $ps_k = (1 - ca_k) * cov_k * r_k$
        where
            $co_k$ denotes whether *pk* collides with existing prisms in *P* (1 — collided, 0 — no collided);
            $cov_k$ denotes the number of voxels covered by *pk*;
            $r_k$ denotes the number of hit voxels by ray-casting the shape of *pk* towards the next uncovered node in *T*.

find $p_{max}$ in $P_{possible}$ for the maximum value *psL*
instantiate the first prism $p_{new}$ at $p_{max}$ *position()* with the orientation of $p_{max}$ *orientation()*.
label the voxels covered by $p_{new}$ as *beCovered*.
if($p_{new}$ covers an uncovered skeleton node *N* in *T*)
        label *N* as *beCovered*
$P_{update}$ - $P_{insert}(p_{new})$
*prismPlacement* ($P_{update}$, V, T)

FIG. 9

SYSTEMS AND METHODS FOR CREATING HAPTIC PROXIES FOR USE IN VIRTUAL REALITY

TECHNICAL FIELD

The present invention relates generally to virtual reality proxies and, more particularly, to creating haptic proxies for use with respect to virtual reality.

BACKGROUND OF THE INVENTION

In recent years, virtual reality (VR) has been gaining an increasing amount of attention in the consumer market. However, it remains challenging to use current VR controllers (e.g., vibration-based controllers) to simulate realistic hand-grasping interaction, which often involves different combinations of thumbs, fingers, and palms (see e.g., Feix, T., Romero, J., Schmiedmayer, H. B., Dollar, A. M., & Kragic, D. (2016), *The grasp taxonomy of human grasp types*, IEEE Transactions on Human-Machine Systems, 46(1), 66-77, the disclosure of which is incorporated herein by reference). This prevents the effective representation of stereognostic information (i.e., the shape, size, and weight) of virtual objects using current VR controllers.

Researchers have spent a significant amount of time and effort in designing various types of haptic instruments for VR. Existing VR haptic instruments can be categorized as two types: active haptic (AH) or passive haptic (PH). AH instruments usually involve fine controlled mechanical and electrical systems. In contrast to AH instruments, PH instruments aim at using existing physical objects to provide haptic feedback (see e.g., Hinckley, K., Pausch, R., Goble, J. C., & Kassell, N. F. (1994, April), *Passive real-world interface props for neurosurgical visualization*, In Proceedings of the SIGCHI conference on Human factors in computing systems (pp. 452-458) the disclosure of which is incorporated herein by reference).

Various configurations of AH instruments have been considered by researchers. For example, handheld deformable controllers (see e.g., Zenner, A., & Krüger, A. (2017), *Shifty: A Weight-Shifting Dynamic Passive Haptic Proxy to Enhance Object Perception in Virtual Reality*, IEEE transactions on visualization and computer graphics, 23(4), 1285-1294 (the disclosure of which is incorporated herein by reference), exoskeletons (see e.g., Bouzit, M., Burdea, G., Popescu, G., & Boian, R. (2002), *The Rutgers Master II—new design force-feedback glove*, IEEE/ASME Transactions on mechatronics, 7(2), 256-263; Choi, I., Culbertson, H., Miller, M. R., Olwal, A., & Follmer, S. (2017, October), *Grabity: A Wearable Haptic Interface for Simulating Weight and Grasping in Virtual Reality*, In Proceedings of the 30th Annual ACM Symposium on User Interface Software and Technology (pp. 119-130); Choi, I., Hawkes, E. W., Christensen, D. L., Ploch, C. J., & Follmer, S. (2016, October), *Wolverine: A wearable haptic interface for grasping in virtual reality*, In Intelligent Robots and Systems (IROS), 2016 IEEE/RSJ International Conference (pp. 986-993); Choi, I., Ofek, E., Benko, H., Sinclair, M., & Holz, C. (2018, April), *CLAW: A Multifunctional Handheld Haptic Controller for Grasping, Touching, and Triggering in Virtual Reality*, In Proceedings of the 2018 CHI Conference on Human Factors in Computing Systems (p. 654); and Perry, J. C., Rosen, J., & Burns, S. (2007), *Upper-limb powered exoskeleton design*, IEEE/ASME transactions on mechatronics, 12(4), 408-417, the disclosures of which are incorporated herein by reference), wearable electric stimulation (see e.g., Yem, V., & Kajimoto, H. (2017, March), *Wearable tactile device using mechanical and electrical stimulation for fingertip interaction with virtual world*, In Virtual Reality (VR), 2017 IEEE (pp. 99-104), the disclosure of which is incorporated herein by reference), and grounded/ungrounded shape-changing surfaces (see e.g., Abtahi, P., & Follmer, S. (2018, April), *Visuo-Haptic Illusions for Improving the Perceived Performance of Shape Displays*, In Proceedings of the 2018 CHI Conference on Human Factors in Computing Systems (p. 150); and Benko, H., Holz, C., Sinclair, M., & Ofek, E. (2016, October), *Normaltouch and texturetouch: High-fidelity 3d haptic shape rendering on handheld virtual reality controllers*, In Proceedings of the 29th Annual Symposium on User Interface Software and Technology (pp. 717-728), the disclosures of which are incorporated herein by reference), have been proposed.

Recent research efforts have attempted to design new types of AH instruments in the form of VR handheld controllers with built in haptic actuators. For example, a VR controller that simulates in-palm friction and torsional forces using sliding contactors in the device's handle has been proposed (see, Provancher, W. (2014), *Creating greater VR immersion by emulating force feedback with ungrounded tactile feedback*, IQT Quarterly, 6(2), 18-21, the disclosure of which is incorporated herein by reference). As another example, an ungrounded weight-shifting VR controller that adjusts the internal weight distribution with a linear stepper actuator has been proposed (see, Zenner, A., & Krüger, A. (2017), *Shifty: A Weight-Shifting Dynamic Passive Haptic Proxy to Enhance Object Perception in Virtual Reality*, IEEE transactions on visualization and computer graphics, 23(4), 1285-1294, the disclosure of which is incorporated herein by reference). Two types of trackable handheld controllers with tiltable planes and actuated pin matrixes, wherein the controllers can haptically render object surfaces and textures on a user's fingertips, have been proposed (see, Benko, H., Holz, C., Sinclair, M., & Ofek, E., *Normaltouch and texturetouch: High-fidelity 3d haptic shape rendering on handheld virtual reality controllers*, referenced above). More recently, a single slip tactile actuator has been used on VR controllers to produce sensations of finger sliding and textures (see, Lo, J. Y., Huang, D. Y., Sun, C. K., Hou, C. E., & Chen, B. Y., *RollingStone: Using Single Slip Taxel for Enhancing Active Finger Exploration with a Virtual Reality Controller*, In Proceedings of UIST 2018, the disclosure of which is incorporated herein by reference). Also, a lightweight pneumatic shape-proxy interface worn on the palm has been developed to simulate the predefined primitive shapes for grasping in VR (see, Teng, S. Y., Kuo, T. S., Wang, C., Chiang, C. H., Huang, D. Y., Chan, L., & Chen, B. Y., *PuPoP: Pop-up Prop on Palm for Virtual Reality*, In Proceedings of UIST 2018, the disclosure of which is incorporated herein by reference). As another example, a handheld controller with a rotary wheel that raises and lowers below the user's finger, wherein the rotary wheel can be attached with different surface textures and input components (e.g., buttons) to simulate interaction with various VR surfaces, has been proposed (see, Whitmire, E., Benko, H., Holz, C., Ofek, E., & Sinclair, M. (2018, April), *Haptic Revolver: Touch, Shear, Texture, and Shape Rendering on a Reconfigurable Virtual Reality Controller*, In Proceedings of the 2018 CHI Conference on Human Factors in Computing Systems (p. 86), the disclosure of which is incorporated by reference). A set of electro-mechanical connections for rendering the stiffness between two HTC VIVE handheld controllers to simulate bimanual object interaction in VR has been proposed (see, Strasnick, E., Holz, C., Ofek, E., Sinclair, M., & Benko, H. (2018, April), *Haptic Links: Bimanual Haptics for Virtual Reality Using Variable Stiffness Actuation*, In Proceedings of the 2018 CHI Conference on Human Factors in Computing Systems (p. 644), the disclosure of which is incorporated herein by reference). A handheld force feedback device which generates 3-DOF VR force feedback using propeller propulsion has also been proposed (see, Heo, S., Chung, C., Lee, G., & Wigdor, D. (2018, April), *Thor's Hammer: An Ungrounded Force Feedback Device Utilizing Propeller-Induced Propulsive Force*, In Proceedings of the 2018 CHI Conference on Human Factors in Computing Systems (p. 525), the disclosure of which is incorporated herein by reference). Although such VR handheld controllers with built in haptic actuators provide a form factor similar to that of commodity VR handheld controllers, these new controllers often restricted a user's hand posture during use. Thus, they place constraints on free-hand grasping interaction with the virtual object, and generally only provide localized feedback on a single finger or single hand. While the above mentioned configuration in which a set of electro-mechanical connections are provided between two HTC VIVE handheld controllers supports bimanual interaction, the configuration is relatively heavy and bulky, resulting in lower comfort than commercial controllers.

Researchers have also investigated using low-fidelity physical objects as haptic proxies to provide various configurations of PH instruments. Compared to AH instruments, low-fidelity PH instruments are less expensive to produce, either by manual prototyping or digital fabrication (e.g., three-dimensional (3D) printing). For example, PH instruments have been used for medical volumetric data visualization (see, Jackson, B., Lau, T. Y., Schroeder, D., Toussaint, K. C., & Keefe, D. F. (2013), *A lightweight tangible 3D interface for interactive visualization of thin fiber structures, IEEE transactions on visualization and computer graphics,* 19(12), 2802-2809, the disclosure of which is incorporated herein by reference), 3D modeling (see, Sheng, J., Balakrishnan, R., & Singh, K. (2006, November), *An interface for virtual 3D sculpting via physical proxy*, In GRAPHITE (Vol. 6, pp. 213-220), the disclosure of which is incorporated herein by reference), interacting with user interface elements (see, Lindeman, R. W., Sibert, J. L., & Hahn, J. K. (1999, March), *Handheld windows: towards effective 2D interaction in immersive virtual environments*, In Virtual Reality, 1999, Proceedings, IEEE (pp. 205-212), the disclosure of which is incorporated herein by reference), and, at a larger scale, representing entire rooms or spaces (see, Insko, B. E., Meehan, M., Whitton, M., & Brooks, F. (2001), *Passive haptics significantly enhances virtual environments*, Doctoral dissertation, University of North Carolina at Chapel Hill, the disclosure of which is incorporated herein by reference). Although a physical proxy can provide natural and real kinesthetic feedback for free-hand grasping, PH instruments are limited by scalability and reusability (see, Simeone, A. L., Velloso, E., & Gellersen, H. (2015, April), *Substitutional reality: Using the physical environment to design virtual reality experiences*, In Proceedings of the 33rd Annual ACM Conference on Human Factors in Computing Systems (pp. 3307-3316), the disclosure of which is incorporated herein by reference). For example, the physical proxies of PH instruments generally require specific physical objects for visually different virtual objects. It is usually a slow and often arduous process to assemble or fabricate the 3D models for each VR experience. Due to low reusability, it is costly and slow to fabricate (e.g., 3D print) 3D models for each virtual experience, and it is unrealistic to require a user to purchase a large set of props for each virtual experience. Accordingly, a platform to select the best haptic matches from the user's current environment for virtual objects has been proposed (see, Hettiarachchi, A., & Wigdor, D. (2016, May), *Annexing Reality: Enabling Opportunistic Use of Everyday Objects as Tangible Proxies in Augmented Reality*, In Proceedings of the 2016 CHI Conference on Human Factors in Computing Systems (pp. 1957-1967), the disclosure of which is incorporated herein by reference). Further, some researchers have proposed leveraging other users to reposition and assemble largescale haptic proxies (see, Cheng, L. P., Roumen, T., Rantzsch, H., Köhler, S., Schmidt, P., Kovacs, R., & Baudisch, P. (2015, November), *Turkdeck: Physical virtual reality based on people*, In Proceedings of the 28th Annual ACM Symposium on User Interface Software & Technology (pp. 417-426), the disclosure of which is incorporated herein by reference).

Through visual warping, a single physical proxy can be used to represent multiple virtual objects of the same type (see, Azmandian, M., Hancock, M., Benko, H., Ofek, E., & Wilson, A. D. (2016, May), *Haptic retargeting: Dynamic repurposing of passive haptics for enhanced virtual reality experiences*, In Proceedings of the 2016 chi conference on human factors in computing systems (pp. 1968-1979), the disclosure of which is incorporated herein by reference). It is challenging, however, to find a physical prop from any given space that is identical/similar to a virtual object. Accordingly, researchers have recently designed a machine-learning-based approach for the design and fabrication of haptic proxies to stimulate the illusion of shape and weight in VR (see, Fujinawa, E., Yoshida, S., Koyama, Y., Narumi, T., Tanikawa, T., & Hirose, M. (2017, November), *Computational design of hand-held VR controllers using haptic shape illusion*, In Proceedings of the $23^{rd}$ ACM Symposium on Virtual Reality Software and Technology (p. 28), the disclosure of which is incorporated herein by reference). The proposed machine-learning based approach is, however, relatively expensive and complicated for a typical VR user to implement.

More recently, shape-changing interfaces have been considered as a type of passive haptic proxy (see McClelland, J. C., Teather, R. J., & Girouard, A. (2017, October), *HaptoBend: shape-changing passive haptic feedback in virtual reality*, In Proceedings of the 5th Symposium on Spatial User Interaction (pp. 82-90), the disclosure of which is incorporated herein by reference). However, the need of users to implement in-VR shape manipulation may require careful design of the VR scenario and storyline.

The addition of tactile feedback to digital content has been explored with respect to shape changing/deformable interfaces (see e.g., Rasmussen, M. K., Pedersen, E. W., Petersen, M. G., & Hornbaek, K. (2012, May), *Shape-changing interfaces: a review of the design space and open research questions*, In Proceedings of the SIGCHI Conference on Human Factors in Computing Systems (pp. 735-744), the disclosure of which is incorporated herein by reference). For example, a linear-actuator matrix form factor has been adopted in tabletop devices (see Follmer, S., Leithinger, D., Olwal, A., Hogge, A., & Ishii, H. (2013, October), in *FORM: dynamic physical affordances and constraints through shape and object actuation*, In Uist (Vol. 13, pp. 417-426), the disclosure of which is incorporated herein by reference), wrist-worn devices (see Huang, D. Y., Guo, R., Gong, J., Wang, J., Graham, J., Yang, D. N., & Yang, X. D. (2017, October), *RetroShape: Leveraging Rear-Surface Shape Displays for 2.5 D Interaction on Smartwatches*, In Proceedings of the 30th Annual ACM Symposium on User Interface Software and Technology (pp. 539-551), the disclosure of which is incorporated herein by reference), and handheld devices (see Jang, S., Kim, L. H., Tanner, K., Ishii, H., & Follmer, S. (2016, May), *Haptic edge display for mobile tactile interaction*, In Proceedings of the 2016 CHI Conference on Human Factors in Computing Systems (pp. 3706-3716), the disclosure of which is incorporated herein by reference), for haptically representing digital information. However, these actuated deformable interfaces often suffer from similar weaknesses to those of AH instruments (e.g., being bulky and not hand-graspable).

The use of robots to assemble physical handheld proxies for VR has been considered. For example, incorporating the advantages of robotic networks, a set of blocktype swarm robots has been proposed to assemble physical handheld proxies (see Zhao, Y., Kim, L. H., Wang, Y., Le Goc, M., & Follmer, S. (2017, October), *Robotic Assembly of Haptic Proxy Objects for Tangible Interaction and Virtual Reality*, In Proceedings of the 2017 ACM International Conference on Interactive Surfaces and Spaces (pp. 82-91), the disclosure of which is incorporated herein by reference). Although a self-assembly robot network could assemble and be reused for various low-fidelity haptic proxies, such a self-assembly robot network generally suffers from low accuracy and speed.

Kits having stick-shaped modular props allowing assembly and disassembly of haptic representations for VR objects have been proposed (see Aguerreche, L., Duval, T., & Lécuyer, A. (2010, November), *Reconfigurable tangible devices for 3D virtual object manipulation by single or multiple users*, In Proceedings of the 17th ACM Symposium on Virtual Reality Software and Technology (pp. 227-230), the disclosure of which is incorporated herein by reference). In other research to provide for modular props for haptic representations for VR objects, construction instructions have been generated for replicating virtual models using LEGO bricks (see Mueller, S., Mohr, T., Guenther, K., Frohnhofen, J., & Baudisch, P. (2014, April), *faBrickation: fast 3D printing of functional objects by integrating construction kit building blocks*, In Proceedings of the SIGCHI Conference on Human Factors in Computing Systems (pp. 3827-3834), the disclosure of which is incorporated herein by reference). However, it can be challenging and time-consuming to piece-by-piece build the shapes for complicated 3D models (see Strobel, J. (2010), *All the better to see you with: A comparison of approaches to delivering instructions for Lego construction tasks* (Doctoral dissertation, Bowling Green State University), the disclosure of which is incorporated herein by reference).

Foldable paper-like devices have also been explored as passive haptic proxies in VR (see McClelland, J. C., Teather, R. J., & Girouard, A. (2017, October), *HaptoBend: shape-changing passive haptic feedback in virtual reality*, referenced above). In operation, a device with embedded folding sensors detected the shape of the device and summoned the 3D object with similar shape. As another example of foldable objects for proxies in VR, a large foldable object has been leveraged to represent cabinets, seats, suitcases, etc. (see Cheng, L. P., Chang, L., Marwecki, S., & Baudisch, P. (2018, April), *iTurk: Turning Passive Haptics into Active Haptics by Making Users Reconfigure Props in Virtual Reality*, In Proceedings of the 2018 CHI Conference on Human Factors in Computing Systems (p. 89), the disclosure of which is incorporated herein by reference) While these systems allowed and guided users to manually change the shapes of the proxies in VR, this feature potentially required careful design of in-VR interaction flows and storylines to reasonably guide user actions.

BRIEF SUMMARY OF THE INVENTION

The present invention is directed to systems and methods which provide for interactive haptic proxies for hand-graspable virtual reality (VR) objects using reconfigurable artifacts and facilitated through use of a haptic reconfigurable artifact toolkit. Embodiments of the invention utilize low-cost reconfigurable artifacts for forming VR objects configured to address the complexity and high cost typically associated with active haptic (AH) instruments, and the low reusability and limited interactivity typically associated with passive haptic (PH) instruments. Reconfigurable artifacts utilized according to embodiments of the invention may be shaped to form reconfigurable artifact-based haptic proxies covering a wide range of hand-grasp postures, offering a significantly better VR experience than existing commercial VR controllers such as due to their low cost, reusability, and accurate kinesthetic feedback for free-hand grasping.

It is generally challenging for VR users to construct reconfigurable artifact-based haptic proxies from scratch by themselves. Accordingly, embodiments of the invention provide a haptic reconfigurable artifact toolkit (also referred to herein as a HapTwist toolkit) to not only provide for reconfigurable artifact-based haptic proxies, but to provide a system for facilitating generation of suitable reconfigurable artifact-based haptic proxies. Embodiments of a HapTwist toolkit include a set of reconfigurable artifacts (e.g., a plurality of reconfigurable structures of the same and/or different sizes) for use in forming reconfigurable artifact-based haptic proxies, a set of haptic hardware components (e.g., a plurality of position trackers, tracker mounts, input modules, and/or output modules) for use with respect to reconfigurable artifact-based haptic proxies, and a haptic reconfigurable artifact software platform configured to facilitate generation of reconfigurable artifact-based haptic proxies (e.g., generate reconfigurable artifact-based shapes based on various models, provide guidance for physical construction of reconfigurable artifact-based haptic proxies, annotate interactive input/output (I/O) modules in the generated shape, and/or export scripting scaffolds for annotated interactive I/O modules) using items of the set of reconfigurable artifacts and the set of haptic hardware components.

A set of reconfigurable artifacts of HapTwist toolkits of embodiments of the invention comprises reusable, reconfigurable, low-cost reconfigurable artifacts that can be shaped and assembled to represent different objects. Reconfigurable artifacts of embodiments can be disassembled and reused for new virtual scenarios. Rubick's Twist (RT) structures may, for example, be utilized as one or more reconfigurable artifacts of a set of reconfigurable artifacts of an embodiment of a HapTwist toolkit. Embodiments of a set of reconfigurable artifacts may, for example, comprise a set of RT structures with different numbers of triangular prisms. A set of reconfigurable artifacts of a HapTwist toolkit may comprise one or more connection structures providing structure allowing multiple reconfigurable artifacts to be concatenated, such as for forming larger and/or more complex objects.

A set of haptic hardware components of HapTwist toolkits of embodiments of the invention comprises tracking hardware (e.g., position trackers, tracker mounts, etc.) that can be used with one or more reconfigurable artifacts formed into a reconfigurable artifact-based haptic proxies to configure a corresponding reconfigurable artifact-based haptic proxy for interactive VR operation. A set of haptic hardware components of HapTwist toolkits of embodiments of the invention additionally or alternatively comprises input modules (e.g. push buttons, switches, triggers, etc.) and/or output modules (e.g., flat vibrators, fans, thermoelectric elements, etc.) that can be used with one or more reconfigurable artifacts formed into a reconfigurable artifact-based haptic proxies to configure a corresponding reconfigurable artifact-based haptic proxy to support active input and/or output.

A haptic reconfigurable artifact software platform of HapTwist toolkits of embodiments of the invention provides an intuitive software interface to facilitate the creation of interactive haptic proxies for VR using one or more reconfigurable artifacts of the set of reconfigurable artifacts, possibly with one or more hardware components of the set of haptic hardware components. Haptic reconfigurable artifact software platforms of embodiments generate shaping and assembly instructions based on three-dimensional (3D) geometric analysis to facilitate the construction of shape-changing-interface based haptic proxies. For example, haptic reconfigurable artifact software platforms of embodiments comprise an algorithm that generates reconfigurable artifact-based structure designs, such as using a set of software scaffoldings and hardware module placements to support haptic proxy interactivity. A haptic reconfigurable artifact software platform may generate reconfigurable artifact-based shapes by geometrically analyzing 3D models through voxelization and skeletonization, and provide guidance for physical construction. Users may indicate the attachments of a position tracker and/or I/O hardware components for the physical proxies using a user interface of embodiments of a haptic reconfigurable artifact software platform. For example, users may annotate the interactive I/O modules in the generated shape provided by a haptic reconfigurable artifact software platform, whereby corresponding scripting scaffolds for the annotated interactive modules are exported. The instructions and scaffolds generated by a haptic reconfigurable artifact software platform of embodiments of HapTwist toolkits support haptic representation of a comprehensive set of hand-grasp VR objects, with significantly improved efficiency of creating interactive VR haptic proxies.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present disclosure, reference is now made to the following descriptions taken in conjunction with the accompanying drawing, in which:

FIGS. 4A-4C, 5A-5C, 6A-6C, and 7A-7C illustrate generation of interactive haptic proxies for hand-graspable virtual reality objects using reconfigurable artifacts through the use of a haptic reconfigurable artifact toolkit of embodiments of the present invention;

FIG. 9 shows a recursive algorithm as may be utilized for prism placement by a haptic reconfigurable artifact toolkit of embodiments of the present invention.

DETAILED DESCRIPTION OF THE INVENTION

Figure 1:
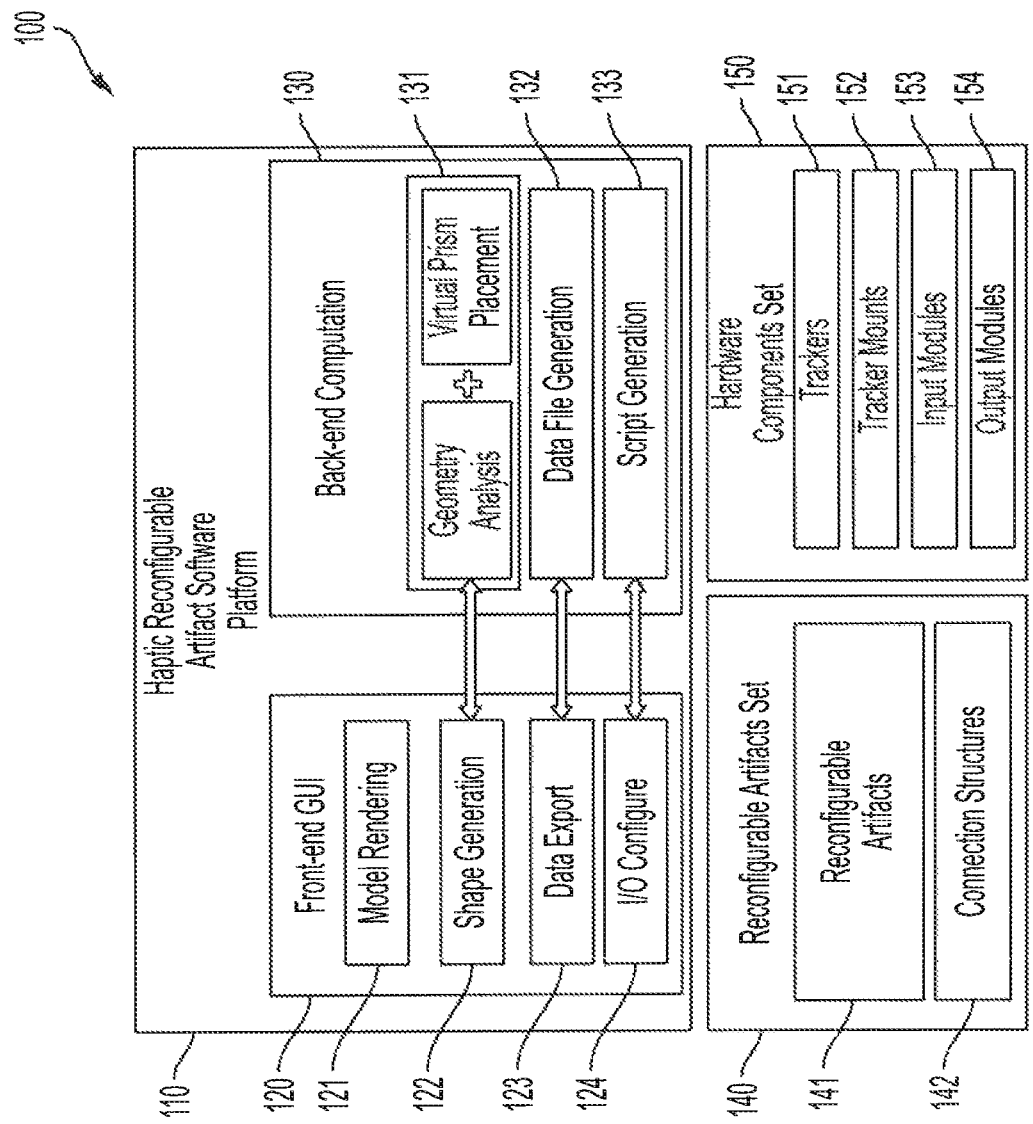
FIG. 1 shows a haptic reconfigurable artifact toolkit configured to facilitate generation of reconfigurable artifact-based haptic proxies in accordance with embodiments of the present invention.

An embodiment of haptic reconfigurable artifact toolkit configured to facilitate generation of reconfigurable artifact-based haptic proxies in accordance with concepts of the present invention is shown as HapTwist toolkit 100 in FIG. 1. Reconfigurable artifact-based haptic proxies designed using HapTwist toolkit 100 of embodiments may, for example, comprise interactive haptic proxies for hand-graspable virtual reality (VR) objects, wherein reconfigurable artifacts are shaped to form reconfigurable artifact-based haptic proxies covering a wide range of hand-grasp postures. Accordingly, HapTwist toolkit 100 of the embodiment illustrated in FIG. 1 includes haptic reconfigurable artifact software platform 110, reconfigurable artifacts set 140, and hardware components set 150 utilized cooperatively in facilitating generation of reconfigurable artifact-based haptic proxies.

Artifacts set 140 of embodiments of HapTwist toolkit 100 comprises various components for use in forming haptic proxies. For example, artifacts set 140 of the illustrated embodiment includes reconfigurable artifacts 141 and connection structures 142 which may be used in cooperation to form different haptic proxies, as desired. Reconfigurable artifacts 141 may include one or more deformable or otherwise adjustable artifacts (e.g., of the same and/or different sizes) that can be shaped and assembled to represent different objects, and that can be disassembled and reused.

Connection structures 142 of embodiments may include one or more structures for connecting the reconfigurable artifacts of reconfigurable artifacts 141 to themselves (e.g., for strength, maintaining a desired shape, etc.) and/or other reconfigurable artifacts (e.g., for concatenating artifacts for forming larger and/or more complex objects).

Reconfigurable artifacts of various configurations, such as may be formed using flexible materials (e.g., paper, clay, cloth, etc.), modular assemblies (e.g., LEGO bricks, slot-together pieces, etc.), and/or twistable joints (e.g., Rubick's Twist (RT) structures), may be utilized by embodiments of HapTwist toolkit 100. Examples of reconfigurable artifacts providing deformable objects and materials include artifacts having flexible/deformable interfaces (see e.g., Holman, D., & Vertegaal, R. (2008), *Organic user interfaces: designing computers in any way, shape, or form*, Communications of the ACM, 51(6), 48-55; Ishii, H. (2008), *The tangible user interface and its evolution*, Communications of the ACM, 51(6), 32-36; Ishii, H., Lakatos, D., Bonanni, L., & Labrune, J. B. (2012), *Radical atoms: beyond tangible bits, toward transformable materials*, Interactions, 19(1), 38-51; Kim, H., Coutrix, C., & Roudaut, A. (2018, April), *Morphees+: Studying Everyday Reconfigurable Objects for the Design and Taxonomy of Reconfigurable UIs*, In Proceedings of the 2018 CHI Conference on Human Factors in Computing Systems (p. 619); and Rasmussen, M. K., Pedersen, E. W., Petersen, M. G., & Hornbwk, K. (2012, May), *Shape-changing interfaces: a review of the design space and open research questions*, In Proceedings of the SIGCHI Conference on Human Factors in Computing Systems (pp. 735-744), the disclosures of which are incorporated herein by reference) and mechanical assemblies (see e.g., Schweikardt, E., & Gross, M. D. (2008, February), *The robot is the program: interacting with roBlocks*, In Proceedings of the 2nd international conference on Tangible and embedded interaction (pp. 167-168) and Weller, M. P., Gross, M. D., & Do, E. Y. L. (2009, April), *Tangible sketching in 3d with posey*, In CHI'09 Extended Abstracts on Human Factors in Computing Systems (pp. 3193-3198), the disclosures of which are incorporated herein by reference. Various configurations of reconfigurable artifacts from different ones of the foregoing categories may be compared according to existing taxonomies on shape-changing artifacts (see Kim, H., Coutrix, C., & Roudaut, A. (2018, April), *Morphees+: Studying Everyday Reconfigurable Objects for the Design and Taxonomy of Reconfigurable UIs*, referenced above), such as for comparing the artifacts in terms of the ease of shaping (e.g., granularity), the strength of holding the shapes (e.g., stiffness), and the reusability. Although flexible materials may be easily shaped (e.g., folded/molded), the process of creating complex shapes with these materials was found to be challenging, with the requirement of advanced crafting skills, such as origami. Rubber and cloth, for example, provide flexible materials that may be easily shaped, but it is difficult to maintain their shape without external force support. Three dimensional (3D) shapes may be "voxelized" into small unified pieces, and using modular assemblies the locking structures can hold the assembled shapes. However, the assembly and disassembly processes was found to be tedious for a large number of modular pieces. It was discovered that the manipulation of a twistable-joint structure can usually be formatted, which supports algorithmic design. Moreover, the plastic stiffness of twistable-joint structures allow for better learning and keeping of shapes, and configurations with large numbers of twistable joints supports expressiveness (see e.g., Kim, H., Coutrix, C., & Roudaut, A. (2018, April), *Morphees+: Studying Everyday Reconfgurable Objects for the Design and Taxonomy of Reconfigurable UIs*, referenced above). In addition, it was discovered that it takes less steps/time to form and reset 3D shapes from twistable-joint structures than the modular assemblies.

Accordingly, the feasibility of using twistable artifacts (e.g., RT structures) for passive VR haptic proxies was investigated and the results showed that such could be shaped to form haptic proxies covering a wide range of hand-grasp postures. Moreover, the twistable artifact-based haptic proxies offered significantly better VR experience than existing commercial VR controllers. Thus, although the individual reconfigurable artifacts provided for use in forming haptic proxies of embodiments of the invention may comprise various forms of deformable or otherwise reconfigurable artifacts, artifacts set 140 of embodiments of HapTwist toolkit 100 comprises a set of twistable artifacts for use in forming reconfigurable artifact-based haptic proxies. The individual twistable artifacts of reconfigurable artifacts 141 may, for example, comprise twistable artifacts of different sizes (e.g., length, scale, weight, etc.).

The individual twistable artifacts of embodiments of reconfigurable artifacts 141 comprise structures having multiple unified parts that are interlocked into a whole with twistable/bendable joints. For example, RT structures, also known as Rubik's Snake (see e.g., Fiore, A. (1981), *Shaping Rubik's Snake*, Penguin Australia, the disclosure of which is incorporated herein by reference), may be utilized as one or more reconfigurable artifacts of reconfigurable artifacts 141 of an embodiment of HapTwist toolkit 100. Embodiments of reconfigurable artifacts 141 may, for example, comprise a set of a plurality of RT structures with different numbers of triangular prisms. In investigating the feasibility of using twistable artifacts for passive VR haptic proxies, it was found that RT-based physical shapes provided significantly better sense of presence for various VR hand-graspable objects over commercial VR controllers.

Figure 2A:
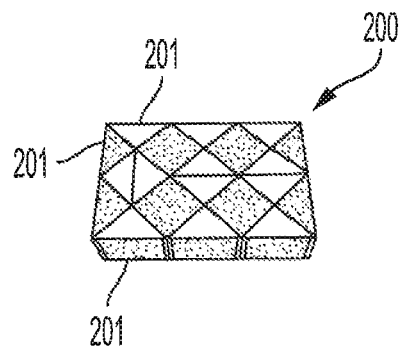
FIG. 2A shows a twistable artifact as may be included as part of a haptic reconfigurable artifact toolkit of embodiments of the present invention.

An example of a Rubik's Twist implementation of a twistable artifact is shown as twistable artifact 200 in FIG. 2A. In the illustrated embodiment of twistable artifact 200, multiple instances of prism 201 (shown individually in FIG. 2B) are connected, so they can be twisted to form complex shapes but not separated. For example, the example shapes FIG. 2C (cross shape 210), FIG. 2D (animal shape 220), and FIG. 2E (geometric shape 230), as well as a variety of other shapes, may be formed from twistable artifact 200 by applying particular types of rotations and translations of prisms 201, such as from the types shown in FIG. 2F as including relative rotation of 0° between particular prisms denoted as p0, relative rotation of 45° between particular prisms denoted as p45, relative rotation of 90° between particular prisms denoted as p90, and relative rotation of 135° between particular prisms denoted as p135.

Hardware components set 150 of embodiments of HapTwist toolkit 100 comprises a set of haptic hardware components for use with respect to reconfigurable artifact-based haptic proxies. The illustrated embodiment of hardware components set 150 comprises trackers 151 for attaching to haptic proxies formed using reconfigurable artifacts of reconfigurable artifacts set 140. For example, trackers 151 may comprise one or more VIVE trackers, available from HTC Corporation, used by a number of VR systems for tracking objects in a VR experience. Correspondingly, tracker mounts 152 of embodiments of hardware components set 150 may comprise mounting structures (e.g., 3D-printed mounting structures configured for use with respect to reconfigurable artifacts 141) providing tracker mounts. The illustrated embodiment of hardware components set 150 further comprises input modules 153 (e.g. push buttons, switches, triggers, etc.) and output modules 154 (e.g., flat vibrators, fans, thermoelectric elements, etc.) that can be used with reconfigurable artifact-based haptic proxies. For example, using appropriate ones of input modules 153 and/or output modules 154, a reconfigurable artifact-based haptic proxy may be configured to support active input and/or output. The input and output modules utilized with reconfigurable artifact-based haptic proxies of embodiments of the invention facilitate active input/output (I/O) without any constraints on a user's hand postures.

To facilitate connection of reconfigurable artifacts to themselves or to other reconfigurable artifacts, artifacts set 140 of the illustrated embodiment includes connection structure 142, such as may include one or more connection slot structure, hook and loop tape, etc. Upon finishing the physical shape construction using one or more reconfigurable artifacts, a user may, for example, fix a tracker of trackers 151 on the shape by fastening a screw in a tracking mount of tracker mounts 152 on the reconfigurable artifact structure. The tracker-mounting structures of embodiments provide output connection (e.g., female-style connection) and input connection (e.g., male-style connection), such as for the POGO pins in the VIVE trackers, for allowing easy connection to I/O components of input modules 153 and/or output modules 154.

In investigating the feasibility of using twistable artifacts for passive VR haptic proxies, it was realized that users found it challenging to construct the twistable artifact-based proxies from scratch by themselves. For example, interviews of participants of a pilot session in which the participants were asked to form shapes corresponding to a smartphone, mug, handgun, and rifle from 3D and 2D images without further instruction revealed that using RT structures could be time-consuming (from 6 to 20 minutes) and challenging for non-experienced users to create the physical shapes. Many participants commented that the most challenging part was to figure out where and how to start, and they spent most of the time on fitting the virtual models by "trial and error." The participants also commented that while the physical shapes provided a realistic haptic sensation, they lacked interactivity (e.g., triggering), especially for active VR objects, such as guns. Accordingly, haptic reconfigurable artifact software platform 110 of embodiments of HapTwist toolkit 100 is configured to provide an intuitive software interface to facilitate the creation of interactive haptic proxies for VR from components of reconfigurable artifacts set 140 and hardware components set 150 (e.g., to form a reconfigurable artifact-based haptic proxy from one or more reconfigurable artifacts, possibly with one or more hardware components of the set of haptic hardware components). Haptic reconfigurable artifact software platform 110 of embodiments of the invention, for example, comprises a processor-based platform operable under control of one or more instruction sets (e.g., software, firmware, etc.) configured to facilitate generation of reconfigurable artifact-based haptic proxies.

Figure 3:
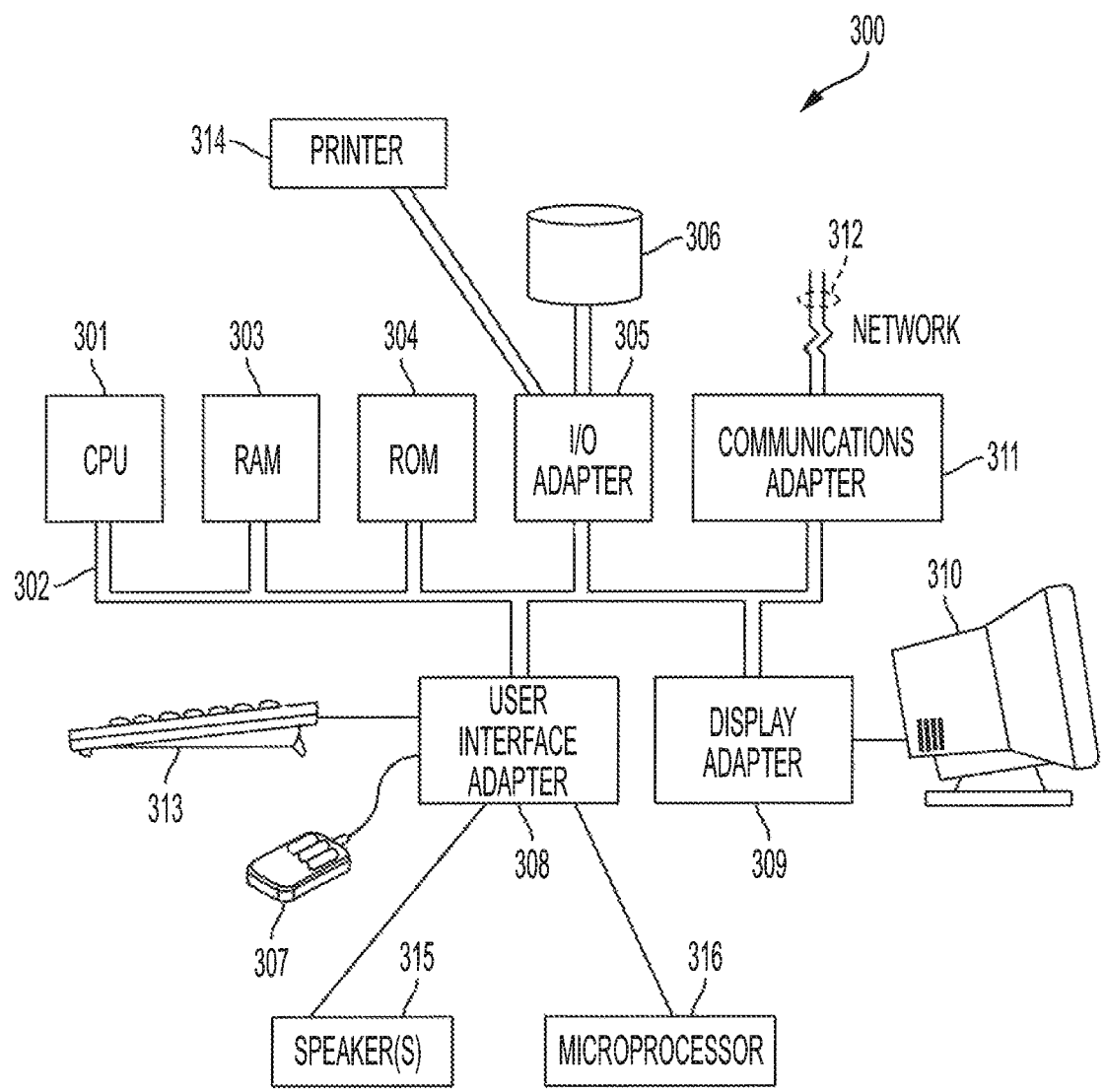
FIG. 3 shows a computer system as may be utilized in implementing a haptic reconfigurable artifact software platform of a haptic reconfigurable artifact toolkit of embodiments of the present invention.
Figure 6A:
Figure 6B:
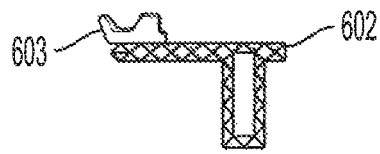
Figure 6C:
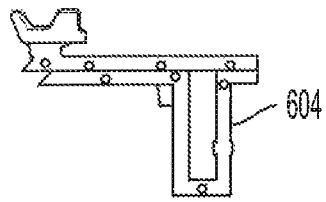
Figure 7A:
Figure 7B:
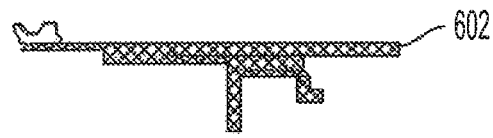
Figure 7C:
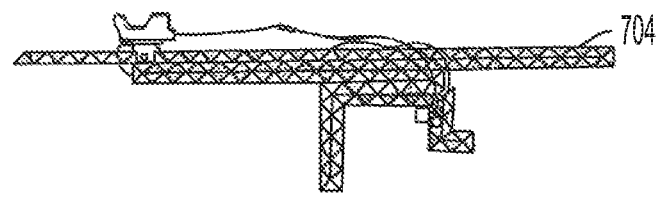

FIG. 3 illustrates computer system 300 as may be utilized in implementing embodiments of haptic reconfigurable artifact software platform 110 or portions thereof. In the illustrated embodiment of computer system 300, central processing unit (CPU) 301 is coupled to system bus 302. CPU 301 may be any general purpose CPU, such as a processor from the CORE line of processors available from Intel Corporation. However, the present invention is not restricted by the architecture of CPU 301 as long as CPU 301 supports the inventive operations as described herein. Bus 302 is coupled to random access memory (RAM) 303, such as may comprise SRAM, DRAM, SDRAM, etc. Read only memory (ROM) 304 is also coupled to bus 302, which may comprise PROM, EPROM, or EEPROM. RAM 303 and ROM 304 may operate to store user and system data and programs (e.g., the aforementioned instruction sets) as is well known in the art.

Bus 302 is also coupled to Input/Output (I/O) controller 305, communications adapter 311, user interface adaptor 308, and display adaptor 309. I/O adapter 305 connects storage devices 306, such as may comprise one or more of a hard drive, a CD drive, an optical drive, etc., to the computer system. I/O adapter 305 is also connected to printer 314, which would allow the system to print paper copies of information such as document, photographs, articles, etc. Note that the printer may be a printer (e.g. dot matrix, laser, etc.), a fax machine, a copier machine, etc. Communications adaptor 311 is adapted to couple computer system 300 to network 312, which may be one or more of a telephone network, a local area network (LAN), a wide-area network (WAN) network, a cellular network, the Internet, and/or one or more other networks. User interface adaptor 308 couples user input devices, such as keyboard 313, pointing device 307, and microphone 316, to the computer system 300. User interface adaptor 308 also provides sound output to a user via speaker(s) 315. Display adaptor 309 is driven by CPU 301 to control the display on display device 310.

Haptic reconfigurable artifact software platform 110 of embodiments of the invention operates to generate reconfigurable artifact-based shapes based on various models, provide guidance for physical construction of reconfigurable artifact-based haptic proxies, annotate interactive input/output (I/O) modules in the generated shape, and/or export scripting scaffolds for annotated interactive I/O modules) using items of the set of reconfigurable artifacts and the set of haptic hardware components. For example, logic of haptic reconfigurable artifact software platform 110 may utilize 3D geometric analysis to generate shaping and assembly instructions to facilitate the construction of shape-changing-interface based haptic proxies.

Generation of interactive haptic proxies for hand-graspable VR objects using reconfigurable artifacts through the use of embodiments of HapTwist toolkit 100 and operation of haptic reconfigurable artifact software platform 110 is generally represented in FIGS. 4A-4C, 5A-5C, 6A-6C, and 7A-7C. In particular, the generation of various exemplary reconfigurable artifact-based shapes are shown in FIGS. 4A-4C (smartphone, approximately sized 5.44" high×2.64" wide×0.27" deep), FIGS. 5A-5C (mug, approximately sixed 3.41" high×3.88" wide×2.88" deep), FIGS. 6A-6C (handgun, approximately sized 6.25" high×10.75" wide×1.25" deep), and FIGS. 7A-7C (rifle, approximately sized 10.5" high×33.5" wide×2.87" deep). It should be appreciated that the examples illustrated in FIGS. 4A-4C, 5A-5C, 6A-6C, and 7A-7C provide a single-handed precision grasp example (mug), a single-handed power grasp with closed palm example (handgun), a single-handed power grasp with opened palm (smartphone), and a bimanual power grasp example (rifle), and thus cover common hand-grasp postures in VR. Generation of interactive haptic proxies for hand-graspable VR objects using HapTwist toolkit 100 of embodiments includes consideration of various attributes regarding the VR proxies, such as the need for precision or power, and the usage of palm, thumb, and other fingers. Although existing hand-grasp taxonomies have mostly focused on single-hand grasping postures, generation of interactive haptic proxies for hand-graspable VR objects using HapTwist toolkit 100 of embodiments includes consideration of the number of hands used for VR objects that involve bimanual grasping.

As represented in the illustrations of FIGS. 4A-4C, 5A-5C, 6A-6C, and 7A-7C, 3D models (e.g., 3D models 401, 501, 601, and 701 represented in FIGS. 4A, 5A, 6A, and 7A) for an object for which a haptic proxy is to be made may be analyzed by logic of haptic reconfigurable artifact software platform 110, and corresponding reconfigurable artifact shape mapping generated (e.g., generated shapes 402, 502, 602, and 702 from reconfigurable artifacts as represented in FIGS. 4B, 5B, 6B, and 7B). As shown in FIGS. 4B, 5B, 6B, and 7B, the generated shapes may be annotated with one or more hardware components (e.g., tracker annotations 403, 503, 603, and 703 in the illustrated examples). These generated shapes may be used to provide guidance for construction of reconfigurable artifact-based haptic proxies, as represented by corresponding ones of physical proxies 404, 504, 604, and 704 of FIGS. 4C, 5C 6C, and 7C, formed using components of reconfigurable artifacts set 140 and hardware components set 150.

To facilitate the creation of reconfigurable artifact-based VR haptic proxies in accordance with concepts of the present invention the embodiment of haptic reconfigurable artifact software platform 110 illustrated in FIG. 1 includes various functional blocks for facilitating generation of interactive haptic proxies for hand-graspable VR objects using reconfigurable artifacts. Such functional blocks may be implemented in software, hardware, or a combination thereof. When implemented in software, elements providing operation as described herein may essentially be the code segments operable upon a host processor-based system, such as computer system 300, to perform the necessary tasks. The program or code segments can be stored in a computer readable medium, such as RAM 303, ROM 304, and/or storage device 306. Additionally or alternatively, the code segments may be downloaded via computer networks, such as network 312. Code segments implementing one or more functional blocks may operate within an operating environment or application executing on the host processor-based system. For example, functional blocks of haptic reconfigurable artifact software platform 100 of embodiments run on the UNITY3D game development engine (e.g., UNITY3D 2017.1.1fl) available from Unity Technologies and/or the VIVE VR system available from HTC Corporation.

The functional blocks shown in the illustrated embodiment of haptic reconfigurable artifact software platform 110 include functional blocks of front-end graphical user interface (GUI) 120, providing for interaction with a user, data input from a user, data output to a user, data import, data export, etc. For example, front-end GUI 120 of the illustrated embodiment comprises model rendering 121, shape generation 122, data export 123, and I/O configure 124. Model rendering 121 of embodiments is configured to generate or otherwise acquire 3D models (e.g., 3D models 401, 501, 601, and 701 represented in FIGS. 4A, 5A, 6A, and 7A) for objects for which a haptic proxy is to be made. Accordingly, model rendering 121 may comprise software and hardware configured to perform 3D scans of various objects, computer aided design software configured for designing 3D models, 3D conversion algorithms configured for converting 2D images to 3D models, an interface configured for accepting input of preexisting 3D models, etc. Shape generation 122 of embodiments comprises software and hardware configured to provide a front-end for shape generation. For example, shape generation 122 may provide a user interface to enable a user to select an object for which a haptic proxy is to be generated, to initiate shape generation for an object for which a haptic proxy is to be generated. In operation according to embodiments, shape generation 122 may interact with other functional blocks of front-end GUI 120, such as to interact with model rendering 121 to allow a user to select a particular 3D model for use in shape generation, possibly allowing the user to modify, edit, and/or embellish the 3D model for shape generation. Additionally or alternatively, shape generation 122 may interact with one or more functional blocks of back-end computation 130, such as to interact with analysis and placement 131 to provide information (e.g., information regarding a selected shape for VR proxy generation) thereto. Data export 123 of embodiments comprises software and hardware configured to export data regarding interactive haptic proxies for hand-graspable VR objects to be generated using reconfigurable artifacts. For example, data export 123 may output information regarding reconfigurable artifact shape mapping (e.g., shapes 402, 502, 602, and 702 from reconfigurable artifacts as represented in FIGS. 4B, 5B, 6B, and 7B) generated by back-end processing 130. Information output by data export may comprise data files, images, instructions, etc., such as may be used to shape reconfigurable artifacts to represent a physical object and to attach components thereto. Accordingly, data export 123 of embodiments interacts with one or more functional blocks of back-end computation 130, such as to interact with analysis and placement 131, data file generation 132, and/or script generation 133 for obtaining data to export. I/O configure 124 of embodiments comprises software and hardware configured to annotate shapes generated by back-end computation 130 with interactive I/O components. For example, I/O configure 124 may provide a user interface enabling a user to annotate generated shapes with one or more input modules and/or output modules, such as to specify a particular type of module (e.g., push button, switch, trigger, vibrator, fan, thermoelectric element, etc.) and/or to designate placements for modules. I/O configure 124 of embodiments may additionally or alternatively comprise a library of other database of interactive I/O components and their applicability to particular shapes to thereby automatically or autonomously annotate, or recommend annotations for, generated shapes with one or more input modules and/or output modules. I/O configure 124 of embodiments interacts with one or more functional blocks of back-end computation 130, such as to interact with analysis and placement 131, data file generation 132, and/or script generation 133 for exchanging information regarding I/O component configuration and/or placement.

The functional blocks shown in the illustrated embodiment of haptic reconfigurable artifact software platform 110 include functional blocks of back-end computation 130, providing for data analysis, shaping and assembly information generation, generation of scripts and data files, etc. For example, back-end GUI 123 of the illustrated embodiment comprises analysis and placement 131, data file generation 132, and script generation 133. Analysis and placement 131 of embodiments is configured to analyze 3D models and to generate reconfigurable artifact shape mappings (e.g., generated shapes 402, 502, 602, and 702 of FIGS. 4B, 5B, 6B, and 7B) for forming haptic proxies for those shapes from reconfigurable artifacts. Accordingly, embodiments of analysis and placement 131 comprises software and hardware configured to analyze 3D model data and to determine orientation, positioning, etc. (collectively referred to as placement) of portions of one or more reconfigurable artifacts for representing the object in the 3D model. The illustrated embodiment of analysis and placement 131 comprises various logic blocks, shown as including geometry analysis logic and virtual prism placement logic, for performing aspects of the aforementioned analysis and placement functionality. Analysis and placement 131 may interact with one or more functional blocks of front-end GUI 120, such as to interact with shape generation 122 to receive information (e.g., information regarding a selected shape for VR proxy generation) therefrom. Data file generation 132 of embodiments software and hardware configured to generate various data files useful in facilitating generation of interactive haptic proxies for hand-graspable VR objects using reconfigurable artifacts. For example, data file generation 132 may generate images, instructions, etc., such as may be used to shape reconfigurable artifacts to represent a physical object and to attach components thereto. Accordingly, data file generation 132 may interact with other functional blocks of back-end computation 130, such as to interact with analysis and placement 131 to receive information regarding reconfigurable artifact configurations determined to represent objects corresponding to the 3D models. Additionally or alternatively, data file generation 132 may interact with one or more functional blocks of front-end GUI 120, such as to interact with data export 123 and/or I/O configure 123 to provide data files useful in facilitating generation of interactive haptic proxies for hand-graspable VR objects thereto and/or to receive information to be included in various data files therefrom. Script generation 133 of embodiments comprises software and hardware configured to facilitate integration of generated haptic proxies into a VR experience. For example, script generation 133 may generate scripting templates, such as to provide scripting scaffolds, for integrating haptic proxies with VR scenarios and storylines. Accordingly, script generation 133 may interact with other functional blocks of back-end computation 130, such as to interact with data file generation 132 to receive information regarding haptic proxies and interactive I/O aspects thereof. Additionally or alternatively, script generation 133 may interact with one or more functional blocks of front-end GUI 120, such as to interact with data export 123 and/or I/O configure 123 to receive information regarding I/O components of haptic proxies and/or to provide output of data regarding integration of the haptic proxies into VR experiences.

It should be appreciated that the above described configuration functional blocks of haptic reconfigurable artifact software platform 110 is exemplary of implementations configured to facilitate generation of interactive haptic proxies for hand-graspable VR objects using reconfigurable artifacts according to concepts of the present invention. Accordingly, haptic reconfigurable artifact software platform 110 of embodiments of HapTwist toolkit 100 may be configured differently than the illustrated embodiment, such as to include additional or alternative functional blocks, to implement additional or alternative interconnectivity of functional blocks, etc., as may be determined to provide operation consistent with concepts herein.

In operation, functional blocks of embodiments haptic reconfigurable artifact software platform 110 implement a process flow that generates reconfigurable artifact shape mapping that is instructive with respect to the forming of reconfigurable artifact-based structures, using reconfigurable artifacts of reconfigurable artifacts set 140 and hardware components of hardware components set 150, to provide interactive haptic proxies (e.g., physical proxies 404, 504, 604, and 704 of FIGS. 4C, 5C 6C, and 7C).

Figure 2B:
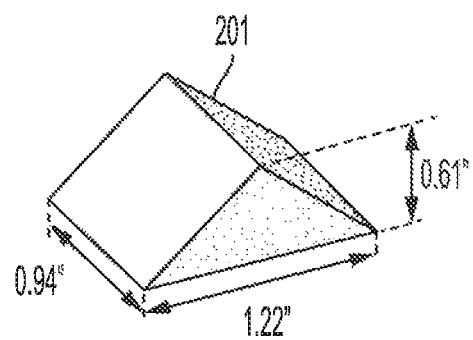
FIG. 2B shows an instance of a prism component of the twistable artifact of FIG. 2A.
Figure 2C:
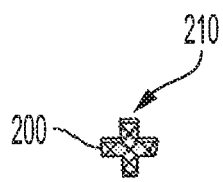
FIGS. 2C-2E show example shapes as may be formed from the twistable artifact of FIG. 2A.
Figure 2D:
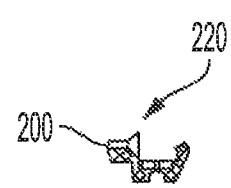
Figure 2E:
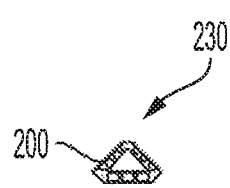
Figure 2F:
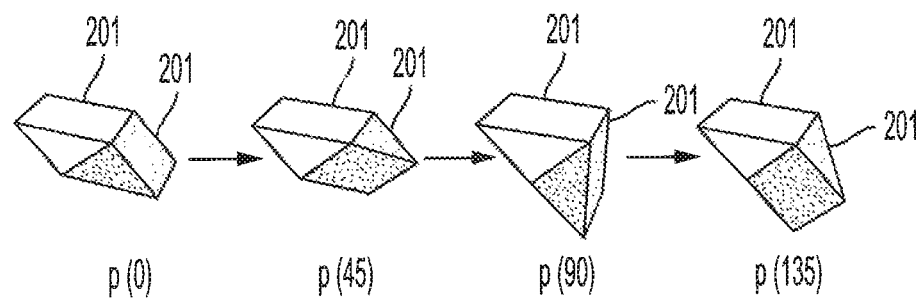
FIG. 2F shows types of rotations and translations of prism components of the twistable artifact of FIG. 2A.
Figure 8:
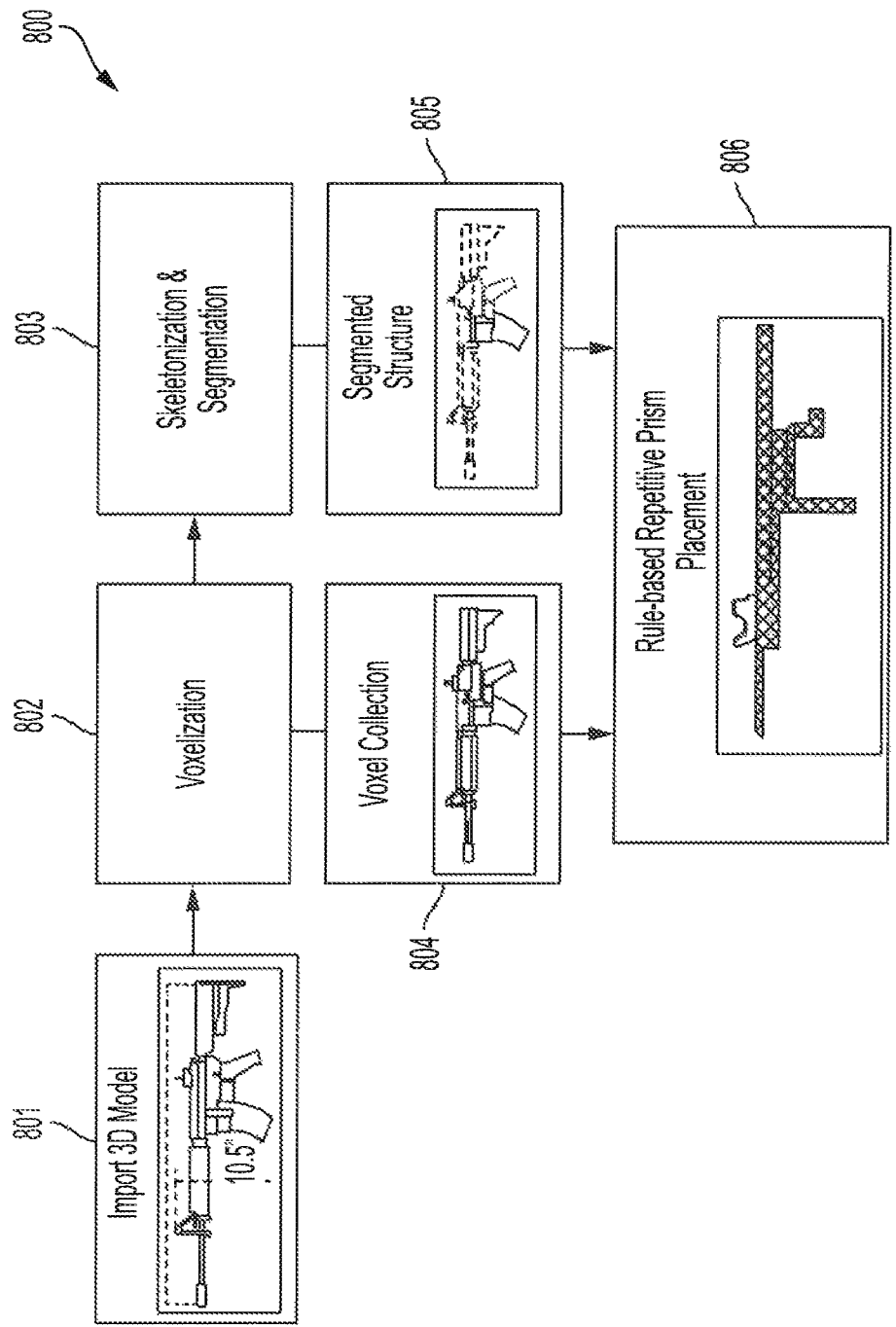
FIG. 8 shows a process flow to generate reconfigurable artifact shape mapping through use of a haptic reconfigurable artifact toolkit of embodiments of the present invention.

A process flow implemented according to embodiments of haptic reconfigurable artifact software platform 110 to generate reconfigurable artifact shape mapping is shown by algorithm 800 of FIG. 8. The example of algorithm 800 is configured for generating RT shapes based on geometric structures of 3D models. As a preprocessing step (not shown) to algorithm 800, a 3D model may be designed with real-world dimensions, and a bounding box of the 3D model obtained. Such 3D model information is imported at block 801 of algorithm 800. In operation of algorithm 800 of embodiments, the 3D model is first voxelized (e.g., voxelized in the form of 6-connected voxel collections with 128×128×128 resolution) at block 802 to provide voxel collection 804. The 3D model may be voxelized according to embodiments using a standard ray-triangle intersection calculation (see e.g., Möller, T., & Trumbore, B. (2005, July), *Fast, minimum storage ray/triangle intersection*, In ACM SIGGRAPH 2005 Courses (p. 7), the disclosure of which is incorporated herein by reference). At block 803 of the illustrated embodiment of algorithm 800, skeletonization and segmentation is performed to provide segmented structure 805. For example, the model's 3D skeleton may be obtained based on the voxel collection (e.g., voxel collection 804 provided by the voxelization of block 802) according to the shape of the central cross section of the 3D model. The voxelized structure may be segmented based on the skeleton tree of the 3D skeleton (see e.g., Reniers, D., & Telea, A. (2007, June), *Skeleton-based hierarchical shape segmentation*, In Shape Modeling and Applications, 2007, SMI'07, IEEE International Conference on (pp. 179-188), the disclosure of which is incorporated herein by reference). At block 806 of the illustrated embodiment of algorithm 800, rule-based repetitive prism placement is implemented to derive an RT-based shape mapping. For example, with the results of the aforementioned preprocessing step, a rule-based repetitive prism placement algorithm may be parameterized for the coverage of the voxels by prisms (i.e., the basic elements of the RT artifacts) of one or more RT artifacts, and a recursive algorithm implemented for determining prism placement. Accordingly, using the above mentioned skeleton tree and the segmented voxel collection, repetitive calculation of proper placements of the 3D prisms may be initiated, wherein the dimension of the 3D prism may be predefined or otherwise known (e.g., 1.22" wide× 0.61" wide×0.94" deep, as shown in FIG. 2B), in operation of embodiments of the invention.

The placement process of block 806 of algorithm 800 may start from an end node of the skeleton (e.g., the end node in the skeleton farthest from a current camera view) and place the first prism of the RT structure at the position of this node, and orient the prism towards the first neighboring node of the starting node in the skeleton. Thereafter, a recursive algorithm of the placement process may be utilized to place the rest of the prisms for the RT-based shape. FIG. 9 shows recursive algorithm 900 as may be utilized for prism placement according to embodiments of the invention.

For the placement of the next prism in accordance with the exemplary recursive algorithm, an RT rule allows for four types of rotations and translations of the prism, denoted as $P_{possible}=\{p0, p45, p90, p135\}$ (see FIG. 2F), wherein the numbers indicate the rotation angle of the next prism relative to the current prism. The placement of the next prism is determined according to embodiments of the invention by a placement score for each possible placement. The placement score utilized according to the illustrated embodiment of recursive algorithm 900 is calculated by the hyperbolic-paraboloid combination of the number of covered voxels and "ray-cast" hit voxels, to make the difference among different placement more observable, compared to the linear combination. Recursive algorithm 900 stops when all voxels are covered. In operation according to embodiments, recursive algorithm 900 will first use the shortest RT structure of reconfigurable artifacts 141 (e.g., a standard 12-piece RT structure), then progressively longer ones of the RT structures, in order to minimize the number of the extra pieces.

An embodiment of haptic reconfigurable artifact software platform 110, implementing a process flow consistent with that of algorithm 800 of FIG. 8 and a recursive algorithm consistent with that of FIG. 9, was experimentally implemented using a UNITY3D game development engine plug-in with the feature of importing 3D models. The experimental implementation supported the generation of RT-based shapes, data/script export, and configuration of interactivity. As the generated shape may involve the assembly of multiple RT artifacts, the plug-in computed the number and the types of RT artifacts needed and highlighted RT structures (each in a different color) needed for forming the shape to be formed. The plug-in also labeled the prisms with number IDs to assist the identification of the twisted positions in the real objects. Generated shapes 402, 502, 602, and 702 shown in FIGS. 4B, 5B, 6B, and 7B are examples of RT-based shapes generated by the experimental haptic reconfigurable artifact software platform for various 3D models. The plug-in also allowed the user to indicate the placement of trackers and hardware I/O components on the generated shape. Furthermore, the plug-in generated a C #-based scripting template for integrating the haptic proxy with the user's VR project. It can be appreciated from the foregoing that the haptic reconfigurable artifact software platform of the experimental implementation generates shaping and assembly instructions based on 3D geometric analysis to facilitate the construction of shape-changing-interface based haptic proxies.

An experimental implementation of HapTwist toolkit 100, utilizing the above mentioned experimental implementation of haptic reconfigurable artifact software platform 110, reconfigurable artifacts 141 comprising RT structures of different lengths, connection structures 142 comprising connection slots for connecting RT structures together, trackers 151 comprising VIVE trackers, tracker mounts 152 comprising 3D printed 3D-printed mounting structures configured for use with the VIVE trackers, input modules 153 comprising push buttons, switches, and triggers, and output modules 154 comprising flat vibrators, fans, and thermoelectric elements, was evaluated with respect to the effectiveness of using the HapTwist-generated shapes as VR haptic proxies and the usability of the toolkit for creating interactive VR haptic proxies. The evaluation focused on the following hypotheses: (H1) While being used as VR haptic proxies, the HapTwist toolkit generated shapes can provide the sense of presence on haptics (i.e., user's perceived consistency of VR and real world, capability of touch-based interaction, ease of object identification via touching, and consistency of the multisensory information in VR) with no significant difference from the real objects; (H2) the HapTwist toolkit can significantly improve user performance (e.g., time spent) on creating RT-based VR haptic proxies, compared to the situation without the HapTwist toolkit; and (H3) The HapTwist toolkit can significantly improve user experience (e.g., perceived workload, ease, and enjoyment) on creating RT-based VR haptic proxies, compared to the situation without the HapTwist toolkit.

In the evaluation of the HapTwist toolkit, twelve participants, with an average age of 24.4 years old (SD=2.93), were invited. To avoid potential bias in users' subjective ratings, the following strategies were adopted (as suggested in Dell, N., Vaidyanathan, V., Medhi, I., Cutrell, E., & Thies, W. (2012, May), *Yours is better!: participant response bias in HCI*, In Proceedings of the SIGCHI Conference on Human Factors in Computing Systems (pp. 1321-1330), the disclosure of which is incorporated herein by reference): 1) All these participants did not attend previous pilot studies regarding the feasibility of use of RT structures for VR proxies, but with similar experience on RT and VR as the pilot-study participants; 2) The study facilitator was from the same ethnic group as the participants; 3) The facilitator did not know the participants in person beforehand, and did not explicitly disclose any personal association with the HapTwist toolkit. Seven participants had previous experience with head mounted display (HMD) based VR, while the rest had never tried but saw others playing VR and HMD before. Ten participants indicated that they had never used RT before, while all of them reported previous experience on 3D content creation (e.g. games and animations).

To study the effectiveness of the generated shapes as VR haptic proxies, a set of RT-based proxies generated by the HapTwist toolkit and the real objects for the four virtual objects shown in FIGS. 4A-7A were prepared. Both types of physical proxies were equipped with VIVE trackers and hardware triggers/buttons.

To investigate the usability of the HapTwist toolkit, each participant was provided with a complete set of the HapTwist toolkit, including a haptic reconfigurable artifact software platform implemented using a UNITY3D game development engine plugin, four RT structures of different lengths, VIVE trackers, hardware I/O modules, connection slots, and a HTC VIVE HMD. The virtual-world prototype was used as the sample UNITY3D game development engine project for integrating the HapTwist-generated proxies. In addition, the participants were given a printed tutorial on how to use the HapTwist toolkit step by step. The tutorial used a 3D model of a pair of pliers as the example.

Each session included one participant and one facilitator. The participant needed to complete two activities: 1) Experience the HapTwist-generated shapes and the real objects as VR haptic proxies; and 2) Use the HapTwist toolkit to create interactive VR haptic proxies.

All the apparatuses were hidden from the participant's sight before the activities to avoid any bias. In the first activity, the participant went through two sub-sessions of VR interaction representing two modes of object manipulation using: 1) The HapTwist-generated proxies; and 2) The real-object proxies. The virtual objects were shown one by one in a random order and the participant could freely interact with the virtual objects. After interacting with each object, the participants took off the HMD, rated the haptic-related questions from a presence questionnaire (see Witmer, B. G., & Singer, M. J. (1998), *Measuring presence in virtual environments: A presence questionnaire*, Presence, 7(3), 225-240, the disclosure of which is incorporated herein by reference), and moved to the next object. The visual and auditory feedback was the same across the two modes, and the two modes of haptic proxies were presented in a Latin-square-based counterbalanced order.

In the second activity, the participant first followed the step-by-step tutorial to create the interactive haptic proxy for a pair of pliers. The participant then continued to use the HapTwist toolkit to create the haptic proxies for the four selected virtual objects, and integrated the proxies into the sample VR project. This was assigned in counterbalanced order based on Latin Square. After the second activity, the participant rated their perceived ease and joy of haptic-proxy creation, and NASA-TLX-based workload, in a 7-likert scale.

The results of the study with regard to the hypotheses for evaluation are outlined below. With respect to hypotheses H1, HapTwist-generated shapes as VR haptic proxies, Mann-Whitney U Test showed that for all four virtual objects, there was no significant difference between using HapTwist-generated shapes and the real objects in terms of the participants' responses to the haptic-related questions in the presence questionnaire. The effect sizes, r, for all haptic-related questions were smaller than 0.1. This indicated the difference between HapTwist-generated proxies and real-world objects was trivial in terms of users' responses to the haptic-related questions, further validating hypotheses H1. With respect to hypotheses H2 and H3, using the HapTwist tool kit to create haptic proxies, the participants generally rated that it was easy to follow the provided tutorial and learn to use the toolkit (6.0/7, SD=0.90), use the toolkit to generate the shape of RTs (5.9/7, SD=0.91), follow the software outcomes to create the RT-based physical shapes (5.7/7, SD=1.07), and integrate the physical RT-based shapes as the haptic proxies to the VR scenario (5.6/7, SD=1.09). In addition, they found it joyful to use the toolkit (6.2/7, SD=0.86), and the satisfaction on the toolkit outcome averagely scored 5.8/7 (SD=1.01).

Figure 10:
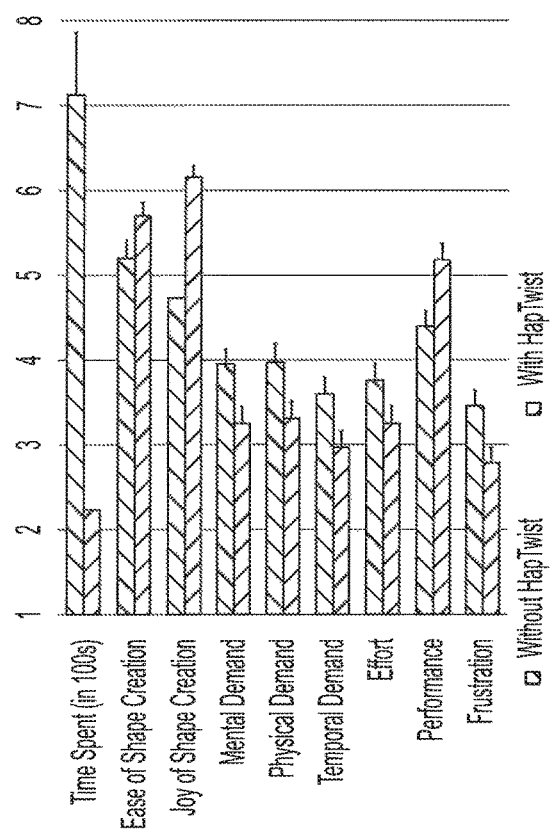
FIG. 10 shows a comparison between the conditions with and without the use of a haptic reconfigurable artifact toolkit of embodiments of the present invention.

FIG. 10 shows a comparison between the conditions with and without the HapTwist toolkit. To examine whether the Hap-Twist toolkit could facilitate the process of haptic-proxy creation, the time the participants spent and the workload on shape creation for the four virtual objects with the HapTwist toolkit and without the HapTwist toolkit was compared. The independent-samples T-Test showed that in overall, the Hap-Twist toolkit significantly shortened the time spent (t(94)=−6.25, p<0.005). Two-way ANOVA showed an interaction effect of the usage of the HapTwist toolkit and the type of the virtual object on the time spent on the physical shape creation (F(3, 88)=3.39, p<0.05, $\eta^2$=0.104). Post-hoc pairwise comparison revealed that the HapTwist toolkit significantly shortened the time spent for creating the rifle model (p<0.005), the mug model (p<0.005), and the smartphone model (p<0.005), while the reduction in working time for the handgun model was marginal (p=0.052).

Mann-Whitney U Test showed the HapTwist toolkit significantly reduced the perceived mental demand (U=949, p<0.05), physical demand (U=950.5, p<0.05), temporal demand (U=961, p<0.05), and frustration (U=896.5, p<0.05) during the process of RT-based shape creation. The Hap-Twist toolkit also significantly improved the perceived performance (U=881.5, p<0.05) and joy (U=520, p<0.005). In the pilot study on creating RT-based shapes without the HapTwist toolkit, many participants commented that "it was difficult to figure out where to start", "I feel a little bit rushing and short of ideas on constructing the model", "feel hard to rotate as the size of model becomes bigger". While using the HapTwist toolkit, all the participants suggested that the software outcome was "helpful", and that "you don't need to be an expert on Rubik's Twist to make the shapes."

While the HapTwist-generated shapes offered a similar VR experience to the selected real objects, the possibility of reusing the generated shapes to haptically represent other virtual objects was also of interest in the study of the effectiveness of the generated shapes as VR haptic proxies. In the questionnaire for after the usage of the HapTwist toolkit, the participants listed possible alternative objects as follows: The mug may be reused as brass knuckles, purse, vase, and teapot; The handgun may be reused as a driller, door handle, crutch, hammer, axe, crossbow, and hoe; The smartphone may be reused as a mirror, remote controller, photo frame, and cigarette box; and The rifle may be used as any long gun, sword, and guitar. The foregoing indicates that one HapTwist-generated physical shape can be used for different virtual objects under the same or different VR scenarios. For instance, the handgun shape can represent a single-handed weapon inventory, while the rifle shape can represent the two-handed weapon inventory. The object switching can be achieved with either a hardware trigger or a scenario change. Such reusability of HapTwist-generated shapes reduces the need of creating multiple haptic proxies.

Although the VIVE trackers used in the study of the effectiveness of the generated shapes as VR haptic proxies were found to provide stable movement tracking and VR rendering, five participants commented that the relatively large size of the tracker affected the experience of touching the virtual objects. They indicated the experience of touching the trackers that were not rendered in VR was "a strange feeling", especially for the small objects (e.g., smartphone and mug). Embodiments of a HapTwist toolkit may solve these issues using smaller device designs. Additionally, the weight of the tracker was sometimes found to cause difficulties on balancing the physical objects while being held. Embodiments of the haptic reconfigurable artifact software platform may include an algorithm to optimize the tracker placement according to the center mass of the object.

Secondly, it was difficult to replicate the details of some virtual objects using RTs. The current algorithm picks the prism pose which covers and "foresees" (ray-cast hit) the most voxels. In the case of the machine gun, the horizontal prism covers and foresees more voxels than the vertical prism at the position of the scope, so this part of the model was omitted. As future work, Embodiments of a haptic reconfigurable artifact software platform may utilize users' annotation to replicate the details of some virtual objects using RTs, such as in situations of complex shape representation. Additionally or alternatively, a neural network for RT shape generation, taking user-created shapes as training sets, may be utilized by haptic reconfigurable artifact software platforms of embodiments to simulate the shape-construction process by the users. Such neural networks may utilize a specific training set for each virtual object. To generate a non-flat 3D shape (e.g. mug) with a single RT structure, embodiments of a haptic reconfigurable artifact software platform may sample the model into layers, and form a volumetric shape by assembling all the RT layers.

The HapTwist toolkit of the exemplary embodiment was found to significantly shorten the time spent on creating interactive haptic proxies using RTs, although the time needed increased along with the size of the virtual object (i.e. average: ~1.5 minutes for the mug model, ~2.5 minutes for the smartphone model, ~3 minutes for the handgun model, and ~8.5 minutes for the rifle model). Accordingly, VR object switching can be potentially achieved by leveraging other users' physical efforts (see Cheng, L. P., Roumen, T., Rantzsch, H., Köhler, S., Schmidt, P., Kovacs, R., . . . & Baudisch, P. (2015, November), *Turkdeck: Physical virtual reality based on people*, referenced above), it may be difficult to create shapes in real time for fast-pace VR interaction. Accordingly, embodiments of a HapTwist toolkit may utilize reconfigurable structures with embedded electro-mechanical modules for automatic transformation.

As can be appreciated from the foregoing HapTwist toolkit 100 of embodiments can be used to generate reconfigurable artifact-based shapes based on the 3D models, and provide guidance for their physical construction. From empirical tests, objects that can be made by some implementations of HapTwist toolkit 100 using a single small RT structure (12-piece) as the reconfigurable artifact may be as small as a cigarette lighter (e.g., 2.5" high×2.0" wide×0.8" deep), and using a single large RT structure (108-piece) as the reconfigurable artifact may be as large as a two-dimensional (2D) replica of a fire extinguisher (e.g., 20.0" high× 10.6" wide×5.2" deep). It should be appreciated, however, that these examples are not limitations of the concepts of the present invention. For example, larger objects can be made in accordance with the concepts of the present invention by combining more reconfigurable artifacts.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for creating haptic proxies for use with respect to virtual reality, the system comprising:
    a set of reconfigurable artifacts comprising a plurality of reconfigurable artifacts of different lengths having multi-piece twistable structures with multiple unified parts that are interlocked into a whole with twistable joints that are configured to be shaped and assembled to represent different objects;
    a set of haptic hardware components comprising a plurality of hardware components selected from the group consisting of tracking hardware, input modules, and output modules; and
    a haptic reconfigurable artifact software platform configured to facilitate generation of reconfigurable artifact-based haptic proxies using items of the set of reconfigurable artifacts and the set of haptic hardware components, wherein the haptic reconfigurable artifact software platform is configured to implement a process flow to generate a reconfigurable artifact shape mapping by applying a rule-based repetitive piece placement algorithm, wherein the rule-based repetitive piece placement algorithm applies a rule for four types of rotations of pieces of a multi-piece twistable structure of the set of reconfigurable artifacts and determines placement of pieces of the multi-piece twistable structure based on a determination of a placement score for each possible placement of the four types of rotations.

2. The system of claim 1, wherein the plurality of reconfigurable artifacts comprise:
    a plurality of Rubick's Twist (RT) structures of different sizes.

3. The system of claim 1, wherein the different lengths of the multi-piece twistable structures comprise different numbers of triangular prisms.

4. The system of claim 1, wherein the set of reconfigurable artifacts further comprises:
    one or more connection structures providing structure configured to concatenate multiple reconfigurable artifacts.

5. The system of claim 1, wherein the tracking hardware comprises:
    position trackers and tracker mounts configured to be used with one or more reconfigurable artifacts formed into a reconfigurable artifact-based haptic proxy.

6. The system of claim 1, wherein the input modules comprise at least one of:
    a push button;
    a switch; and
    a trigger.

7. The system of claim 1, wherein the output modules comprise at least one of:
    a vibrator;
    a fan; and
    a thermoelectric element.

8. The system of claim 1, wherein the haptic reconfigurable artifact software platform comprises:
    a software plug-in configured for operation with a development engine executing on a host processor-based system.

9. The system of claim 1, wherein the haptic reconfigurable artifact software platform is configured to generate reconfigurable artifact-based shapes based on three dimensional models and provide guidance for physical construction of reconfigurable artifact-based haptic proxies.

10. The system of claim 9, wherein the haptic reconfigurable artifact software platform is further configured to annotate interactive input modules and output modules in the generated reconfigurable artifact-based shapes.

11. The system of claim 10, wherein the haptic reconfigurable artifact software platform is further configured to export scripting scaffolds for annotated interactive input modules and output modules.

12. The system of claim 1, wherein the process flow is configured to generate the reconfigurable artifact shape mapping based on geometric structures of three dimensional (3D) models.

13. The system of claim 12, wherein the process flow performs voxelization of 3D model to provide a voxel collection, and performs skeletonization and segmentation to provide segmented structure.

14. The system of claim 12, wherein the process flow implements a recursive algorithm for placement of prisms of a Rubick's Twist (RT) structure used as a reconfigurable artifact to generate a reconfigurable artifact-based shape.

15. The system of claim 14, wherein the recursive algorithm applies the rule for four types of rotations of the prisms of the RT structure.

16. The system of claim 15, wherein the recursive algorithm determines placement of prisms of the RT structure based on the determination of the placement score for each possible placement of the four types of rotations.

17. The system of claim 1, wherein the placement score is determined by a hyperbolic-paraboloid combination of a number of covered voxels and ray-cast hit voxels.

18. The system of claim 1, wherein the rule-based repetitive piece placement algorithm first uses a shortest reconfigurable artifact of the plurality of reconfigurable artifacts and then progressively longer ones of the reconfigurable artifacts of the plurality of reconfigurable artifacts in order to minimize a number of extra pieces.

19. A method for reconfigurable artifact shape mapping for creating haptic proxies from reconfigurable artifacts, the method comprising:
providing a haptic reconfigurable artifact toolkit having a set of reconfigurable artifacts of different lengths having multi-piece twistable structures with multiple unified parts that are interlocked into a whole with twistable joints, a set of haptic hardware components, and a haptic reconfigurable artifact software platform configured to facilitate generation of reconfigurable artifact-based haptic proxies using items of the set of reconfigurable artifacts and the set of haptic hardware components;
generating, through operation of the haptic reconfigurable artifact software platform implementing a process flow applying a rule-based repetitive piece placement algorithm, a reconfigurable artifact shape mapping based on a geometric structure of a three dimensional (3D) model to provide a generated reconfigurable artifact-based shape for use with one or more reconfigurable artifacts of the set of reconfigurable artifacts, wherein the rule-based repetitive piece placement algorithm applies a rule for four types of rotations of pieces of a multi-piece twistable structure of the set of reconfigurable artifacts and determines placement of pieces of the multi-piece twistable structure based on a determination of a placement score for each possible placement of the four types of rotations; and
annotating, using the haptic reconfigurable artifact software platform, on the generated reconfigurable artifact-based shape mapping at least one interactive module of the set of haptic hardware components.

20. The method of claim 19, wherein the set of reconfigurable artifacts comprises a plurality of reconfigurable artifacts that are configured to be shaped and assembled to represent different objects.

21. The method of claim 20, wherein generating the reconfigurable artifact shape mapping comprises:
determining placement of prisms of a reconfigurable artifact of the plurality of reconfigurable artifacts using the rules for four types of rotations with respect to the prisms.

22. The method of claim 19, wherein the set of haptic hardware components comprises one or more of an input module or an output module configured for use on a reconfigurable artifact of the set of reconfigurable artifacts when formed in the generated reconfigurable artifact-based shape.

23. The method of claim 22, wherein the set of haptic hardware components comprises at least one position tracker, the method further comprising:
indicating an attachment position of a position tracker of the set of haptic hardware components on the generated reconfigurable artifact-based shape.

24. The method of claim 19, further comprising:
executing code of the haptic reconfigurable artifact software platform as a development engine plug-in executing on a host processor-based system.

25. The method of claim 19, further comprising:
exporting, by the haptic reconfigurable artifact software platform, scripting scaffolds for annotated interactive input modules and output modules.

26. The method of claim 19, wherein the generating the reconfigurable artifact shape mapping based on the geometric structure of the 3D model to provide the generated reconfigurable artifact-based shape comprises:

performing voxelization of the 3D model to provide a voxel collection; and
performing skeletonization and segmentation to provide segmented structure.

27. The method of claim 19, wherein the applying the rule-based repetitive piece placement algorithm comprises:
implementing a recursive algorithm for placement of prisms of a Rubick's Twist (RT) structure used as a reconfigurable artifact to generate a reconfigurable artifact-based shape.

28. The method of claim 19, wherein implementing the rule-based repetitive piece placement algorithm comprises:
determining the placement score for each possible placement of the four types of rotations of prisms of a multi-piece twistable structure of the set of reconfigurable artifacts; and
determining placement of prisms of the multi-piece twistable structure based on the placement score for each possible placement of the four types of rotations.

29. The method of claim 19, wherein determining the placement score comprises:
determining a hyperbolic-paraboloid combination of a number of covered voxels and ray-cast hit voxels.

30. The method of claim 19, wherein the rule-based repetitive piece placement algorithm first uses a shortest reconfigurable artifact of the set of reconfigurable artifacts and then progressively longer ones of the reconfigurable artifacts of the set of reconfigurable artifacts in order to minimize a number of extra pieces.

31. A system for creating haptic proxies for use with respect to virtual reality, the system comprising:
a set of reconfigurable artifacts comprising a plurality of reconfigurable artifacts of different lengths having multi-piece twistable structures with multiple unified parts that are interlocked into a whole with twistable joints that are configured to be shaped and assembled to represent different objects;
a set of haptic hardware components comprising tracking hardware, one or more input modules, and one or more output modules; and
a haptic reconfigurable artifact software platform configured to facilitate generation of reconfigurable artifact-based haptic proxies using items of the set of reconfigurable artifacts and the set of haptic hardware components by generating reconfigurable artifact-based shapes based on three dimensional (3D) models, providing guidance for physical construction of reconfigurable artifact-based haptic proxies, and annotating interactive input modules and output modules in the generated reconfigurable artifact-based shapes, wherein the haptic reconfigurable artifact software platform is configured to implement a process flow to generate a reconfigurable artifact shape mapping by applying a rule-based repetitive piece placement algorithm, wherein the rule-based repetitive piece placement algorithm applies a rule for four types of rotations of pieces of a multi-piece twistable structure of the set of reconfigurable artifacts and determines placement of pieces of the multi-piece twistable structure based on a determination of a placement score for each possible placement of the four types of rotations.

32. The system of claim 31, wherein the different lengths of the multi-piece twistable structures comprise different numbers of triangular prisms.

33. The system of claim 31, wherein the set of reconfigurable artifacts further comprises:
one or more connection structures providing structure configured to concatenate multiple reconfigurable artifacts.

34. The system of claim 31, wherein the tracking hardware comprises:
position trackers and tracker mounts configured to be used with one or more reconfigurable artifacts formed into a reconfigurable artifact-based haptic proxy.

35. The system of claim 31, wherein the one or more input modules comprise at least one of:
a push button;
a switch; and
a trigger.

36. The system of claim 31, wherein the one or more output modules comprise at least one of:
a vibrator;
a fan; and
a thermoelectric element.

37. The system of claim 31, wherein the haptic reconfigurable artifact software platform comprises:
a software plug-in configured for operation with a development engine executing on a host processor-based system.

38. The system of claim 31, wherein the haptic reconfigurable artifact software platform is further configured to export scripting scaffolds for annotated interactive input modules and output modules.

39. The system of claim 31, wherein the haptic reconfigurable artifact software platform is configured to implement the process flow to generate the reconfigurable artifact shape mapping based on geometric structures of the 3D models.

40. The system of claim 39, wherein the process flow performs voxelization of 3D model to provide a voxel collection, and performs skeletonization and segmentation to provide segmented structure.

41. The system of claim 39, wherein the process flow implements a recursive algorithm for placement of prisms of a Rubick's Twist (RT) structure used as a reconfigurable artifact to generate a reconfigurable artifact-based shape.

42. The system of claim 41, wherein the recursive algorithm determines placement of prisms of the RT structure based on the determination of the placement score for each possible placement of the four types of rotations of the prisms of the RT structure, wherein the placement score is determined by a hyperbolic-paraboloid combination of a number of covered voxels and ray-cast hit voxels.

* * * * *